(12) United States Patent
Hayashi et al.

(10) Patent No.: US 8,045,829 B2
(45) Date of Patent: Oct. 25, 2011

(54) OPTICAL WAVEGUIDE MEMBER, OPTICAL WIRING BOARD, OPTICAL WIRING MODULE AND METHOD FOR MANUFACTURING OPTICAL WAVEGUIDE MEMBER AND OPTICAL WIRING BOARD

(75) Inventors: Katsura Hayashi, Shiga (JP); Yutaka Tsukada, Shiga (JP)

(73) Assignee: Kyocera Corporation, Kyoto-shi Kyoto (JP)

( * ) Notice: Subject to any disclaimer, the term of this patent is extended or adjusted under 35 U.S.C. 154(b) by 450 days.

(21) Appl. No.: 12/095,372

(22) PCT Filed: Nov. 27, 2006

(86) PCT No.: PCT/JP2006/323623
§ 371 (c)(1),
(2), (4) Date: Jul. 11, 2008

(87) PCT Pub. No.: WO2007/063813
PCT Pub. Date: Jun. 7, 2007

(65) Prior Publication Data
US 2010/0061679 A1    Mar. 11, 2010

(30) Foreign Application Priority Data

| Dec. 2, 2005 | (JP) | 2005-349755 |
|---|---|---|
| Dec. 2, 2005 | (JP) | 2005-349756 |
| Dec. 2, 2005 | (JP) | 2005-349757 |
| Jan. 31, 2006 | (JP) | 2006-023933 |
| Jan. 31, 2006 | (JP) | 2006-023934 |
| Jul. 31, 2006 | (JP) | 2006-209311 |

(51) Int. Cl.
*G02B 6/12* (2006.01)
*G02B 6/10* (2006.01)
*B05D 5/12* (2006.01)
*B29C 65/00* (2006.01)

(52) U.S. Cl. ............ 385/14; 385/131; 427/58; 427/123; 156/247

(58) Field of Classification Search .............. 385/14, 385/131; 427/58, 123; 156/247
See application file for complete search history.

(56) References Cited

U.S. PATENT DOCUMENTS
6,438,281 B1 * 8/2002 Tsukamoto et al. .......... 385/14
(Continued)

FOREIGN PATENT DOCUMENTS
JP    6-167622 A    6/1994
(Continued)

OTHER PUBLICATIONS

Office Action dated May 18, 2010 from corresponding Japanese application No. 2006-100686.
(Continued)

*Primary Examiner* — Ryan Lepisto
*Assistant Examiner* — Jerry Blevins
(74) *Attorney, Agent, or Firm* — Birch, Stewart, Kolasch & Birch, LLP

(57) ABSTRACT

The present invention provides a method for manufacturing an optical waveguide. The inventive method includes steps of providing a transfer member comprising a transfer sheet and a first metal film. The transfer sheet and the first metal film are detachable from each other. A laminated body made of a core layer disposed between two clad layers is formed on the transfer member. The invention also relates to optical waveguides produced by the inventive process and devices incorporating the optical waveguides of the invention.

13 Claims, 16 Drawing Sheets

U.S. PATENT DOCUMENTS

| | | |
|---|---|---|
| 6,793,405 B1 | 9/2004 | Murata et al. |
| 2002/0061154 A1 | 5/2002 | Tsukamoto et al. |
| 2003/0223692 A1* | 12/2003 | Ikarashi et al. .................. 385/38 |
| 2004/0131304 A1 | 7/2004 | Kondo |
| 2005/0238278 A1* | 10/2005 | Nakashiba et al. ............. 385/14 |
| 2006/0120658 A1 | 6/2006 | Naitou et al. |

FOREIGN PATENT DOCUMENTS

| | | |
|---|---|---|
| JP | 2000-214351 A | 8/2000 |
| JP | 2000-298217 A | 10/2000 |
| JP | 2000-340906 A | 12/2000 |
| JP | 2001-004854 A | 1/2001 |
| JP | 2001-108853 | 4/2001 |
| JP | 2001-166167 A | 6/2001 |
| JP | 2001-242348 A | 9/2001 |
| JP | 2002-107560 A | 4/2002 |
| JP | 2005-084126 A | 3/2005 |
| JP | 2005-148129 | 6/2005 |
| JP | 2005-300930 A | 10/2005 |
| WO | WO-00/08505 A1 | 2/2000 |

OTHER PUBLICATIONS

Office Action dated Dec. 14, 2010 (w/English Translation) from corresponding Japanese application No. 2006-321804.

Office Action dated Aug. 17, 2010 from corresponding Japanese Patent Application No. 2006-100686 (English translation).

Office Action dated Oct. 5, 2010 from corresponding Japanese application No. 2005-349755 (English translation).

Office Action dated Oct. 5, 2010 from corresponding Japanese application No. 2005-349757 (English translation).

* cited by examiner

OPTICAL WAVEGUIDE MEMBER, OPTICAL WIRING BOARD, OPTICAL WIRING MODULE AND METHOD FOR MANUFACTURING OPTICAL WAVEGUIDE MEMBER AND OPTICAL WIRING BOARD

RELATED APPLICATIONS

This Application is the National Phase Under 35 U.S.C. §371 of PCT International Application No. PCT/JP2006/323623 which has an International filing date of Nov. 27, 2006, which claims priority to Japanese Application No. 2005-349755 filed on Dec. 2, 2005, Japanese Application No. 2005-349756 filed on Dec. 2, 2005, Japanese Application No. 2005-349757 filed on Dec. 2, 2005, Japanese Application No. 2006-023933 filed on Jan. 31, 2006, Japanese Application No. 2006-023934 filed on Jan. 31, 2006, and Japanese Application No. 2006-209311 filed on Jul. 31, 2006. The entire contents of all applications listed above are hereby incorporated by reference.

BACKGROUND OF THE INVENTION

1. Field of the Invention

The present invention relates to an optical waveguide member for transmitting an optical signal, an optical circuit board, an optical circuit module, a display apparatus, a method for manufacturing the optical waveguide member, and a method for manufacturing the optical circuit board.

2. Description of the Related Art

Recently, optical signals have been used instead of electrical signals as media for transmitting information. Optical waveguide members having optical waveguides formed therein are used as means for transmitting the optical signals.

An exemplary known optical waveguide member includes a core layer that allows light to propagate therethrough, a first clad layer that covers the core layer, and a second clad layer that also covers the core layer. A light-emitting element is provided on a surface of the optical waveguide member.

The known optical waveguide member is manufactured by successively forming the first clad layer, the core layer, and the second clad layer on a support board, such as a printed circuit board, in that order. The core layer is strip-shaped and has an inclined surface at a longitudinal one end thereof. The inclined surface is formed such that the distance between the inclined surface and the first clad layer is increased toward the longitudinal one end. The inclined surface is formed by the process that first a core material layer made of the material of the core layer is formed on the first clad layer, then, anisotropic etching is applied to a longitudinal one end of the core material layer before the second clad layer is formed.

Japanese Unexamined Patent Application Publication No. 2005-148129 (page 11 and FIG. 2) is an example of related art.

In the method for manufacturing the known optical waveguide member, anisotropic etching is performed to form the inclined surface of the core layer, and it is difficult to control the shape of the inclined surface. Therefore, manufacturing process of the optical waveguide member is complicated.

An object of the present invention is to provide an optical waveguide member, an optical circuit board including the optical waveguide member, an optical circuit module including the optical circuit board and an optical semiconductor element, a display apparatus including the optical waveguide member, a method for manufacturing the optical waveguide member, and a method for manufacturing the optical circuit board, which address the above-described problem.

SUMMARY OF THE INVENTION

According to one embodiment of the invention, a method for manufacturing an optical waveguide member comprises preparing a transfer member comprising a transfer sheet and a first metal film, the transfer sheet and the first metal film being detachable from each other; forming a first clad layer on the first metal film of the transfer member; forming a core layer which allows light to propagate therethrough on the first clad layer; forming a second clad layer on the core layer so that the second clad layer covers the core layer to obtain a laminated body comprising the first clad layer, the core layer, and the second clad layer; and forming a through electrode in the laminated body.

According to one embodiment of the invention, the method for manufacturing the optical waveguide member further comprises detaching the transfer sheet from the laminated body and the first metal film.

According to one embodiment of the invention, the method for manufacturing the optical waveguide member further comprises removing the first metal film after the transfer sheet is detached from the laminated body and the first metal film.

According to one embodiment of the invention, the method for manufacturing the optical waveguide member further comprises patterning the metal film after the transfer sheet is detached from the layered body and the first metal film.

According to one embodiment of the invention, the method for manufacturing the optical waveguide member further comprises forming an inclined surface on the core layer, wherein an angle $\alpha$ between the inclined surface and a surface of the core layer, the surface of which is in contact with the first clad layer, is less than 90 degrees.

According to one embodiment of the invention, the method for manufacturing the optical waveguide member further comprises forming a reflective film on the inclined surface of the core layer, so that the laminated body comprises the reflective film.

According to one embodiment of the invention, in the above-described method for manufacturing the optical waveguide member, the transfer sheet comprises a second metal film on a surface of the transfer sheet that faces the first metal film, the second metal film being detachable from the first metal film.

According to one embodiment of the invention, in the above-described method for manufacturing the optical waveguide member, a third metal film is formed on the second clad layer.

According to one embodiment of the invention, in the above-described method for manufacturing the optical waveguide member, wherein at least one of the first metal film and the third metal film is formed in a predetermined pattern.

According to one embodiment of the invention, a method for manufacturing an optical circuit board comprises preparing a transfer member comprising a transfer sheet and a first metal film, the transfer sheet and the metal film being detachable from each other; forming a first clad layer on the first metal film of the transfer member; forming a core layer which allows light to propagate therethrough on the first clad layer; forming a second clad layer on the core layer so that the second clad layer covers the core layer to obtain a laminated body comprising the first clad layer, the core layer, and the second clad layer; forming a through electrode in the laminated body; adhering the laminated body to a circuit board such that the second clad layer faces the circuit board; and detaching the transfer sheet from the laminated body and the first metal film.

According to one embodiment of the invention, the method for manufacturing the optical circuit board further comprises removing the first metal film after the transfer sheet is detached from the laminated body and the first metal film.

According to one embodiment of the invention, the method for manufacturing the optical circuit board further comprises patterning the first metal film after the transfer sheet is detached from the laminated body and the first metal film.

According to one embodiment of the invention, the method for manufacturing the optical circuit board further comprises forming an inclined surface on the core layer. An angle α between the inclined surface and a surface of the core layer, the surface of which is in contact with the first clad layer, is less than 90 degrees.

According to one embodiment of the invention, the method for manufacturing the optical circuit board further comprises forming a reflective film on the inclined surface of the core layer. The laminated body includes the reflective film.

According to one embodiment of the invention, an optical circuit board comprises a circuit board; and an optical waveguide member disposed on the circuit board. The optical waveguide member comprises a first clad layer, a second clad layer closer to the circuit board than the first clad layer, a plurality of core layers between the first clad layer and the second clad layer, and a through electrode penetrating the first and the second clad layers, the through electrode being connected to the circuit board. Each core layer comprises an inclined surface. An angle α between the inclined surface of each core layer and a surface of the core layer, the surface of which faces the first clad layer, is equal to or less than 90 degrees. An area in a cross section of the through electrode is larger at a side of the circuit board than at a side opposite to the circuit board.

According to one embodiment of the invention, in the above-described method for manufacturing the optical circuit board, the angle α is in the range of 41 degrees to 49 degrees.

According to one embodiment of the invention, in the above-described method for manufacturing the optical circuit board, each inclined surface is curved such that the inclined surface has convex toward the second clad layer.

According to one embodiment of the invention, in the above-described method for manufacturing the optical circuit board, each inclined surface is covered with a reflective film that reflects light.

According to one embodiment of the invention, in the above-described method for manufacturing the optical circuit board, the second clad layer is formed so as to cover each inclined surface and the reflective film.

According to one embodiment of the invention, in the above-described method for manufacturing the optical circuit board, the optical waveguide member has a flat surface.

According to one embodiment of the invention, in the above-described method for manufacturing the optical circuit board, the optical waveguide member has a conductive layer on a surface of the first clad layer, the surface of which is opposite to the circuit board.

According to one embodiment of the invention, in the above-described method for manufacturing the optical circuit board, the optical waveguide member has a resin layer disposed between the conductive layer and the opposite surface of the first clad layer to the circuit board, the conductive layer being formed by electroless plating.

According to one embodiment of the invention, an optical circuit module comprises the optical circuit board; and optical semiconductor elements connected to an electronic circuit pattern on the optical circuit board.

According to one embodiment of the invention, an optical waveguide member comprises a first clad layer; a core layer on the first clad layer, comprising an inclined surface; a second clad layer that continuously covers the core layer; and a through electrode penetrating the first and the second clad layers. The inclined surface is covered by the second clad layer. An area in a cross section of the through electrode is larger at a side of the second clad layer than at a side of the first clad layer.

According to one embodiment of the invention, the above-described optical waveguide member, further comprises a pair of metal films, at least one of the metal films being adhered to each of the clad layers by a transferring process.

According to one embodiment of the invention, a display apparatus comprises a display unit; an operating unit operable to control the display unit; and the above-described optical waveguide member. The optical waveguide member optically connects the display unit and the operating unit to each other.

Advantages

According to the invention, in the process of forming the optical circuit board or the optical circuit module, the optical waveguide member is transferred onto the circuit board. Therefore, the inclined surface can be easily formed on the core layer of the optical waveguide member and the productivity of the manufacturing process can be improved.

Figure 1A:
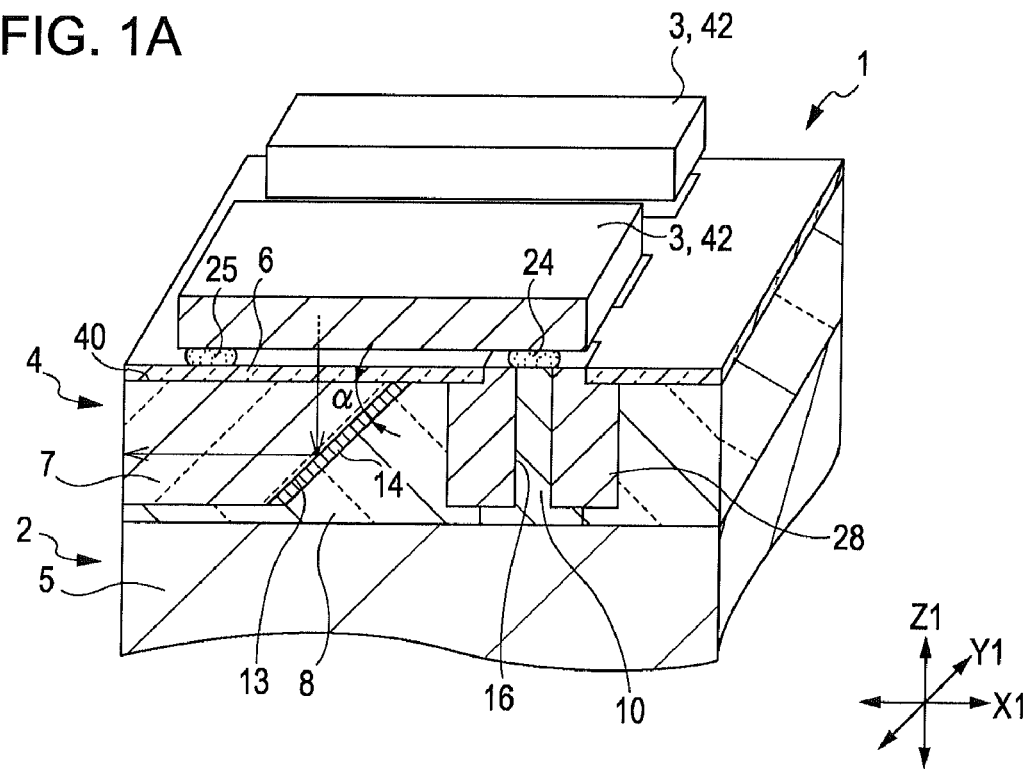
FIG. 1A is a perspective sectional view of an optical circuit module according to a first embodiment of the present invention.

NUMERICAL REFERENCES 1 optical circuit module
2 optical circuit board
3 light emitting element
4 optical waveguide member
5 support board
6 first clad layer
7 core layer
8 second clad layer
10 through electrode
13 inclined surface
14 reflective film
16 through hole
26 transfer member
26a transfer sheet
26b first metal film
26a' second metal film
42 light receiving element
52 third metal film
62 light-blocking member
63 light transmitting member
64 resin material layer
65 first conductive material layer
66 second conductive material layer
105 mobile phone apparatus
106 display unit
107 first housing
108 operating unit
109 second housing
110 connecting unit Description of the Preferred Embodiments Embodiments of the present invention will be described below with reference to the drawings. In each embodiment, components similar to those of previous embodiments are denoted by the same reference numerals, and redundant explanations are thus omitted for convenience. In one embodiment where only a portion of the structure is explained, the other portions of the structure in one embodiment are similar to those of the previous embodiments. In addition to combinations of components explained in each embodiment, components of different embodiments may also be used in combination as long as there is no problem with the combination.

First Embodiment

FIG. 1A is a perspective sectional view of an optical circuit module 1 according to a first embodiment.

The optical circuit module 1 basically includes an optical circuit board 2 and light emitting elements 3 mounted on the optical wiring board 2, the light emitting elements 3 being as optical semiconductor elements. The optical circuit board 2 includes a support board 5 that functions as a circuit board and an optical waveguide member 4 which is disposed on the support board 5 and on which the light emitting elements 3 are mounted.

The optical circuit module 1 transmits electrical signals supplied from the support board 5 to the light emitting elements 3 via the through electrodes of the optical waveguide member 4, and thereby the light emitting elements 3 emit light in accordance with the electrical signals. Light emitted from the light emitting elements 3 is transmitted, as optical signals, to an external connection member, such as an optical fiber, through the optical waveguide member 4.

The optical circuit board 2 basically has a rectangular plate-like shape. In the following description, the thickness direction of the optical circuit board 2 (vertical direction in FIGS. 1A to 1D) is defined as the Z1 direction, the longitudinal direction of the optical circuit board 2 (horizontal direction in FIGS. 1A to 1D) is defined as the X1 direction, and a direction perpendicular to the Z1 and X1 directions (depth direction in FIGS. 1A to 1D) is defined as the Y1 direction.

The support board 5 is a circuit board having circuit conductors provided thereon. The support board 5 includes an insulating substrate including an insulating material, such as resin, alumina ceramic, or glass ceramic, and the circuit conductors including conductive material, such as copper, gold, silver, and aluminum, and provided on the insulating substrate. The support board 5 may either have a single-layer circuit structure or a multilayer circuit structure. The support board 5 supports the optical waveguide member 4 at the top surface thereof, and the circuit conductors supply the electrical signals to the light emitting elements 3 via through electrodes 10 formed in the optical waveguide member 4. In the case where the optical circuit module 1 is included in a calculating machine, such as a computer, the circuit conductors on the support board 5 are electrically connected to an integrated circuit (IC) of a central processing unit (CPU) or the like.

The optical waveguide member 4 placed on the support board 5 includes a first clad layer 6 disposed on a side of the light emitting elements 3; a second clad layer 8 that is in contact with the support board 5; a plurality of core layers 7 arranged between the first clad layer 6 and the second clad layer 8, each core layer 7 having an inclined surface 13; a reflective film 14 disposed on the inclined surfaces 13; and the through electrodes 10 that electrically connect the light emitting elements 3 to the circuit conductor of the support board 5. The thickness of the optical waveguide member 4 in the Z1 direction is in the range of 50 μm to 100 μm. The principal surfaces of the optical waveguide member 4, that is, a surface of the first clad layer 6 and a surface of the second clad layer 8, are flat.

Each of the core layers 7 is formed in a strip shape so as to extend in the X1 direction, and those core layers 7 are arranged in the Y1 direction with spaces there between. Each of the core layers 7 has a rectangular or square cross section along a plane parallel to the Y1 and Z1 directions. Each of the core layers 7 has the inclined surface 13 at an end thereof in the X1 direction. The inclined surfaces 13 are inclined with respect to the X1 direction such that an inclination angle α between a surface 40 of each core layer 7 facing the first clad layer 6 and the inclined surface 13 of the core layer 7 is smaller than 90°. The inclination angle α of each inclined surface 13 is preferably in the range of 41° to 49°. In the present embodiment, the inclination angle α is set to 45°. If the inclination angle a is in the range of 41° to 49°, light from the light emitting elements 3 can be well transmitted toward the core layers 7 and the transmission loss of the optical signals can be reduced. However, the inclination angle α may also be set to an angle outside the range of 41° to 49°. In addition, it is not necessary that the inclined surface 13 be formed at an end of each core layer 7. The reflective films 14 disposed on the inclined surfaces 13 includes a light-reflecting material, such as aluminum, nickel, and chrome.

The first clad layer 6, the core layers 7, and the second clad layer 8 include a light transmitting material. The refractive index of the first and second clad layers 6 and 8 is different from that of the core layers 7. The core layers 7 have a higher refractive index than that of the first and the second clad layers 6 and 8, and include the same light transmitting material as the first and second clad layers 6 and 8. The light transmitting material may be, for example, epoxy resin, acrylic resin, polysilanol resin, polysilane, polysilazane resin, or glass. It is not necessary that the core layers 7, the first clad layer 6, and the second clad layer 8 include the same light transmitting material. The core layers 7, the first clad layer 6, and the second clad layer 8 may also include different light transmitting materials as long as the refractive index of the core layers 7 is higher than those of the first and second clad layers 6 and 8.

The through electrodes 10 include conductive material, such as copper, silver, gold, aluminum, nickel, chrome, iron, tungsten, and molybdenum, and are formed in a columnar shape. The through electrodes 10 are arranged in the Y1 direction.

The through electrodes 10 preferably include material having a thermal conductivity of 100 W/m·K or more and an electrical resistivity of $1.0 \times 10^{-7}$ Ω·m or less at room temperature (25° C.). In such a case, during the operation of the light emitting elements 3 or other electronic elements that are mounted on the optical waveguide member 4 and electrically connected to the respective through electrodes 10, heat generated by the light emitting elements 3 or other electronic elements can be reliably dissipated via the through electrodes 10. Therefore, the operation of the light emitting elements 3 or other electronic elements can be stabilized.

Among the above-mentioned materials of the through electrodes 10, copper, silver, gold, aluminum, molybdenum, and tungsten are preferable. The thermal conductivity and electrical resistivity of copper are 395 W/m·K and $1.69 \times 10^{-8}$ Ω·m, respectively. The thermal conductivity and electrical resistivity of aluminum are 223 W/m·K and $2.66 \times 10^{-8}$ Ω·m, respectively. The thermal conductivity and electrical resistivity of gold are 293 W/m·K and $2.44 \times 10^{-8}$ Ω·m, respectively. The thermal conductivity and electrical resistivity of molybdenum are 147 W/m·K and $5.78 \times 10^{-8}$ Ω·m, respectively. The thermal conductivity and electrical resistivity of tungsten are 167 W/m~K and $5.5 \times 10^{-8}$ Ω·m, respectively.

The through electrodes 10 are disposed in through holes 16 formed in electrode-forming portions 28 made of the same material as that of the core layers 7. The cross section of each through electrode 10 along a plane parallel to the XY plane at a position close to the support board 5 is larger than that at a position close to the light emitting elements 3. Surfaces of the electrode-forming layers 28 facing the light emitting elements 3 are partially exposed at the surface of the first clad layer 6. Surfaces of the electrode-forming layers 28 facing the support board 5 are covered by the second clad layer 8 and the through electrodes 10. More specifically, surfaces of the first clad layer 6, the electrode-forming layers 28, and the through electrodes 10 are exposed at a surface of the optical waveguide member 4 facing the light emitting elements 3, and the exposed surfaces are substantially flat. In addition, surfaces of the second clad layer 8 and the through electrodes 10 are exposed at a surface of the optical waveguide member 4 facing the support board 5, and the exposed surfaces are substantially flat.

The light emitting elements 3 mounted on the first clad layer 6 of the optical waveguide member 4 are, for example, vertical cavity surface-emitting lasers (VCSELs). Each of the light emitting elements 3 is electrically connected to a pair of electrodes 10 via bumps 24. A pair of dummy bumps 25 corresponding to the bumps 24 are provided so as to prevent each of the light emitting elements 3 from becoming inclined with respect to the optical waveguide member 4. The bumps 24 and the dummy bumps 25 includes a conductive material, such as gold (Au) and solder.

The light emitting elements 3 are arranged at a position where laser beams emitted therefrom can be incident on the respective inclined surfaces 13 in the optical waveguide member 4 (for example, at a position directly above the inclined surfaces 13). When electrical signals are supplied from the support board 5 to the light emitting elements 3 via the through electrodes 10, the light emitting elements 3 emit laser beams toward the inclined surfaces 13 in accordance with the electrical signals. The laser beams are reflected in the X1 direction by the reflective film 14 provided on each of the inclined surfaces 13. The reflected laser beams propagate through the core layers 7 as optical signals. In this manner, electrical signals are converted into optical signals.

In the present embodiment, the VCSELs are used as the light emitting elements 3. However, the light emitting elements 3 are not limited to VCSELs, and edge emitting laser diodes or other devices may also be used as long as laser beams can be emitted. Instead of the light emitting elements 3, light receiving elements 42 may also be disposed on the optical circuit board 2. In the case where the light receiving elements 42 are disposed on the optical circuit board 2, optical signals transmitted through the optical waveguide member 4 are converted into electrical signals by the light receiving elements 42. More specifically, light that propagates through the core layers 7 is incident on the inclined surfaces 13 and is reflected toward the light receiving elements 42 by the reflective film 14. The reflected light is incident on the light receiving elements 42, and the light receiving elements 42 supply electrical signals corresponding to the incident light to the support board 5 via the through electrodes 10. In this manner, optical signals are converted into electrical signals.

Figure 2:
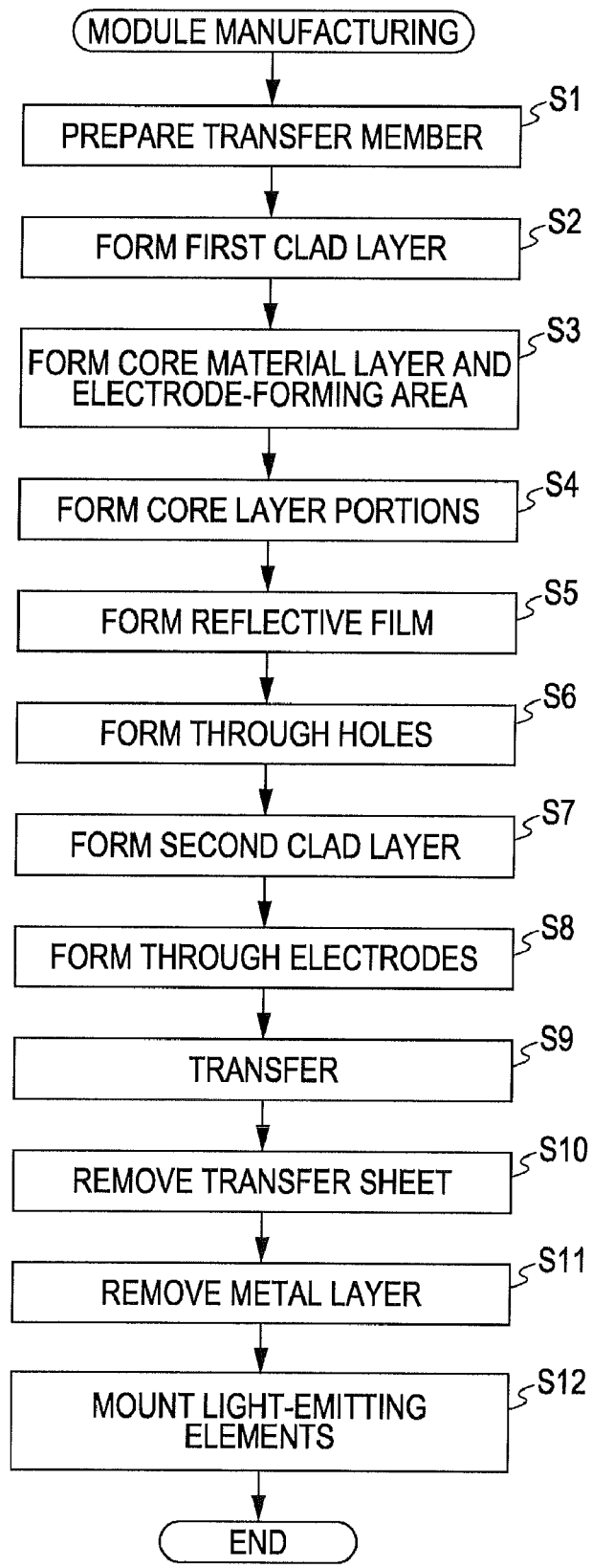
FIG. 2 is a flowchart of a method for manufacturing the optical circuit module shown in FIG. 1.
Figure 3A:
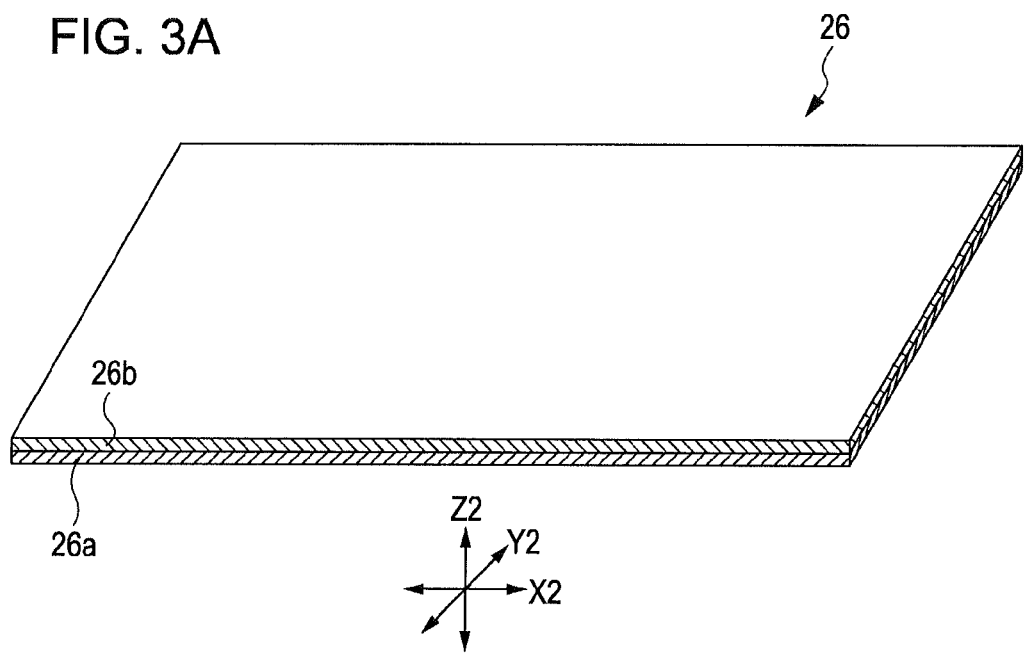
FIG. 3A is a perspective sectional view illustrating the method for manufacturing the optical circuit module shown in FIG. 1.

FIG. 2 is a flowchart of a method for manufacturing the optical circuit module 1 having the above-described structure. FIGS. 3A to 3N are perspective sectional views illustrating the structure in each step. The method for manufacturing the optical circuit module 1 is described with reference to the flowchart shown in FIG. 2.

First, in step S1, a rectangular transfer member 26 shown in FIG. 3A is prepared. In the following description, the thickness direction of the transfer member 26 (vertical direction in FIGS. 3A to 3F) is defined as the Z2 direction, the longitudinal direction of the transfer member 26 (horizontal direction in FIGS. 3A to 3F) is defined as the X2 direction, and a direction perpendicular to the Z2 and X2 directions (depth direction in FIGS. 3A to 3F) is defined as the Y2 direction.

The transfer member 26 includes a transfer sheet 26a made of glass-fiber-reinforced epoxy resin, plastic, stainless steel, nickel alloy, aluminum, titanium, etc., and a metal film 26b made of a conductive material, such as copper. The transfer sheet 26a and the metal film 26b are adhered to each other such that they are detachable from each other. A releasing agent may be interposed between the transfer sheet 26a and the metal film 26b so that the transfer sheet 26a and the metal film 26b may be easily peeled off each other.

The optical waveguide member 4 is formed on the transfer member 26 and is then transferred onto the support board 5. In this process, first, the optical waveguide member 4 is adhered to the support board 5 together with the transfer member 26. Then, the transfer sheet 26a included in the transfer member 26 is peeled off the metal film 26b. Then, the metal film 26b is removed by etching. Thus, the optical waveguide member 4 is transferred onto the support board 5. The thickness of the metal film 26b formed on the transfer sheet 26a is preferably in the range of 3 μm to 35 μm so that the metal film 26b can be easily removed by etching.

As shown in FIG. 3N, the transfer sheet 26a may have a second metal film 26a' made of a conductive material, such as copper, on a surface thereof facing the metal film 26b.

In such a case, the metal film 26b and the second metal film 26a' are to be peeled off each other. Therefore, a releasing agent may be interposed between the metal films 26b and 26a'.

Figure 3B:
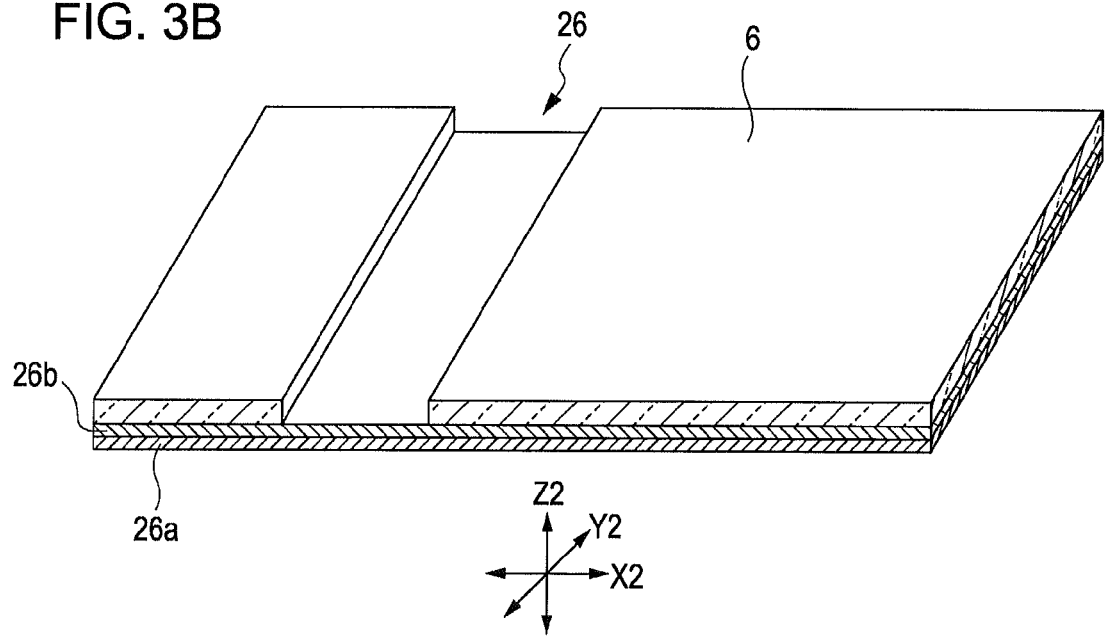
FIG. 3B is another perspective sectional view illustrating the method for manufacturing the optical circuit module shown in FIG. 1.

In step S2, the first clad layer 6 is formed on the metal film 26b of the transfer member 26, as shown in FIG. 3B. The first clad layer 6 is formed as follows. That is, first, liquid obtained by dissolving a light transmitting material in a solvent is applied to the metal film 26b by using a spin coater, a bar coater, a doctor blade, a die coater, a dip coater, etc. Second, the applied liquid is dried so that a first clad material layer is stacked on the transfer member 26 in the Z2 direction (on top of the transfer member 26 in FIGS. 3A to 3F). The first clad material layer is subjected to a photolithography process or etching to form a predetermined pattern. Thus, the first clad layer 6 is obtained. The first clad layer 6 may also be formed by other various processing methods, such as a method of forming the pattern by placing the first clad material layer in a mold.

Figure 3C:
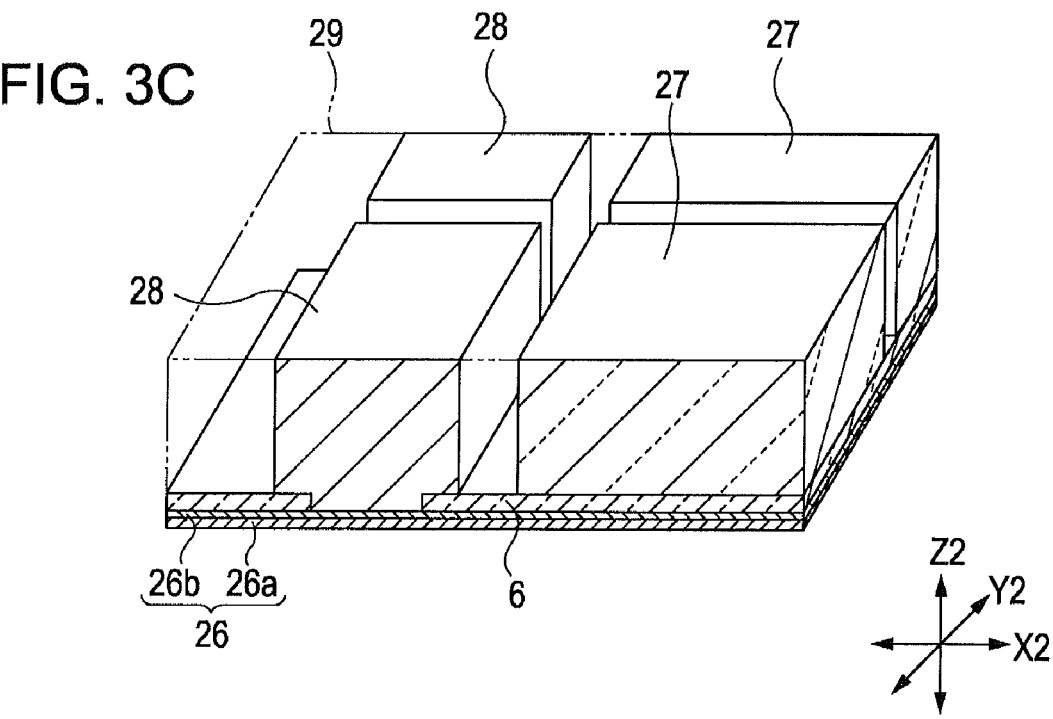
FIG. 3C is another perspective sectional view illustrating the method for manufacturing the optical circuit module shown in FIG. 1.

In step S3, each of the core material layers 27 and each of the electrode-forming layers 28 are formed on the first clad layer 6, as shown in FIG. 3C.

More specifically, first, liquid obtained by dissolving the light transmitting material of the core layers 7 in a solvent is applied to the transfer member 26 and the first clad layer 6 by using a spin coater, a bar coater, a doctor blade, a die coater, a dip coater, etc. Second, the applied liquid is dried so that a light transmitting material layer 29 is formed. The light transmitting material layer 29 is subjected to a photolithography process or etching to form a predetermined pattern. Thus, the core material layers 27 and the electrode-forming layers 28 are formed.

Figure 3D:
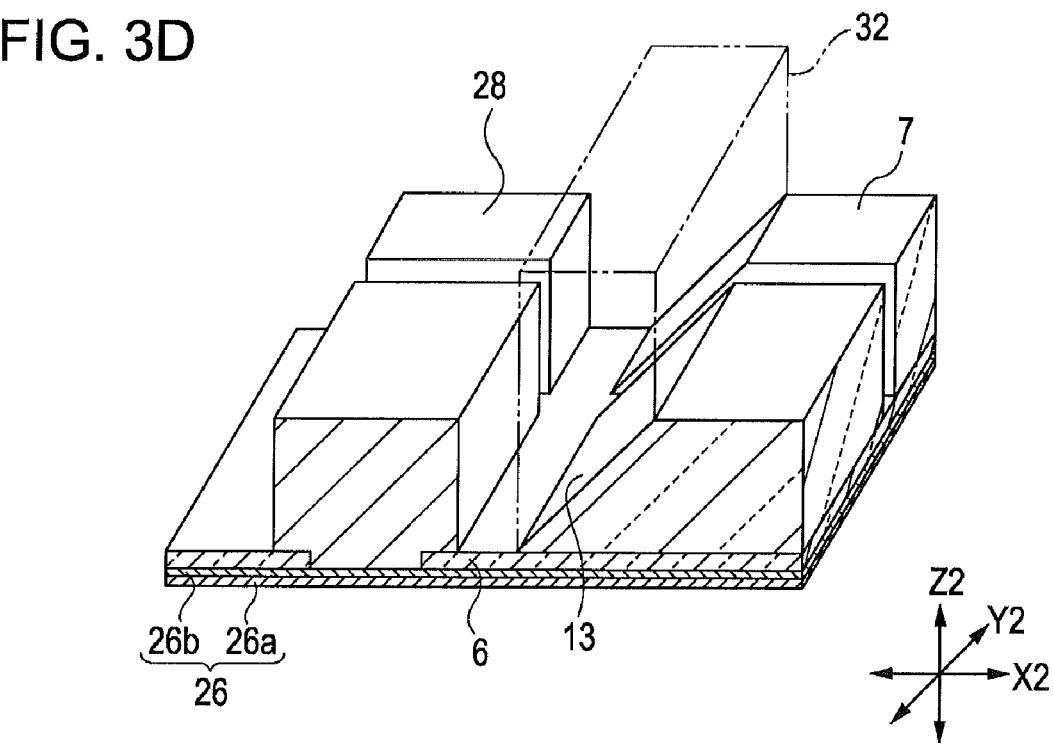
FIG. 3D is another perspective sectional view illustrating the method for manufacturing the optical circuit module shown in FIG. 1.

In step S4, the core layers 7 are formed by processing the core material layers 27, as shown in FIG. 3D. First, the inclined surfaces 13 are formed by pressing a tool 32 made of a hard material, such as a grinding tool comprising diamond, against the core material layers 27 at one end thereof in the X2 direction. In this manner, the inclined surfaces 13 can be easily formed. The tool 32 has an end with a shape corresponding to that of the inclined surfaces 13, as shown by the imaginary lines in FIG. 3D. The tool 32 can be obtained by, for example, nanoimprinting or microembossing. The tool 32 can be pressed against the core material layers 27 while the core material layers 27 are in either a completely cured state or a partially-cured state.

However, if the tool 32 is pressed against the core material layers 27 while the core material layers 27 are in a completely cured state, there is a risk that cracks will be formed in the core material layers 27. Therefore, the core material layers 27 are preferably processed while they are in a partially-cured state. The partially-cured state refers to the state in which 25% to 80% of the resin has undergone a polymerization reaction.

In the present embodiment, the inclined surfaces 13 are formed by mechanical processing. However, the processing method of the inclined surfaces 13 is not limited to this. For example, the inclined surfaces 13 may also be formed by laser processing or etching. Etching is not limited to photolithography processes, and plasma etching or ion beam etching may also be used.

In step S5, the reflective film 14 is formed on the inclined surfaces 13. More specifically, a reflective material, such as aluminum, nickel, and chromium, is applied to the inclined surfaces 13 by using a thin-film forming technique, such as physical vapor deposition (PVD). Thus, the reflective film 14 is formed on the inclined surfaces 13.

In step S6, the through holes 16 are formed in the electrode-forming layers 28. The through holes 16 are formed by photolithography, die machining, etching, etc., depending on the characteristics of the material of the optical waveguide. In the present embodiment, step S6 is executed after step S5. However, step S6 may also be executed between step S4 and step S5, between step S3 and step S4, or between step S7 and step S8 by laser processing. When the technique of photolithography or die machining is used, the positional accuracy of the through holes 16 with respect to the optical waveguide can be ensured. When the through holes 16 are formed by laser processing, thin, long through holes 16 can be easily obtained.

Figure 3E:
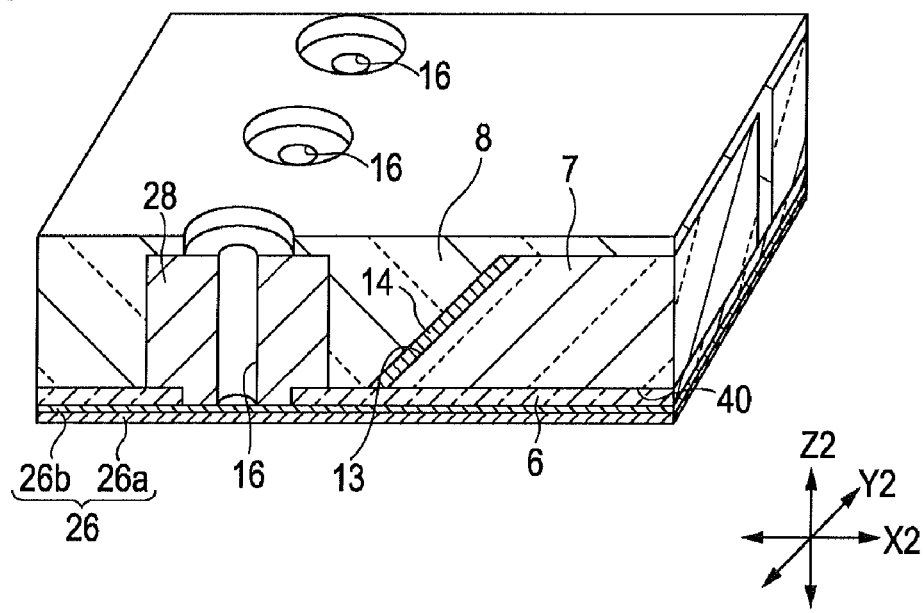
FIG. 3E is another perspective sectional view illustrating the method for manufacturing the optical circuit module shown in FIG. 1.

In step S7, the second clad layer 8 is formed on the first clad layer 6 and the core layers 7 as shown in FIG. 3E. First, a liquid obtained by dissolving the light transmitting material of the second clad layer 8 in a solvent is applied to the first clad layer 6, the core layers 7, and the electrode-forming layers 28 by using a spin coater, a bar coater, a doctor blade, a die coater, a dip coater, etc. Second, the applied liquid is dried so that a second clad material layer is formed. The second clad material layer is processed in a predetermined pattern, and thereby the second clad layer 8 is obtained. A surface of the second clad material layer may be planarized by polishing. The surface may be polished using, for example, a grinding wheel containing abrasive grains of alumina, silicon carbide, diamond etc. Alternatively, the surface may polished by using a brush while the abrasive grain is applied to the surface, or by using buff. The surface of the second clad material layer may also be cut by a cutting tool made of diamond to planarize the surface.

Figure 3F:
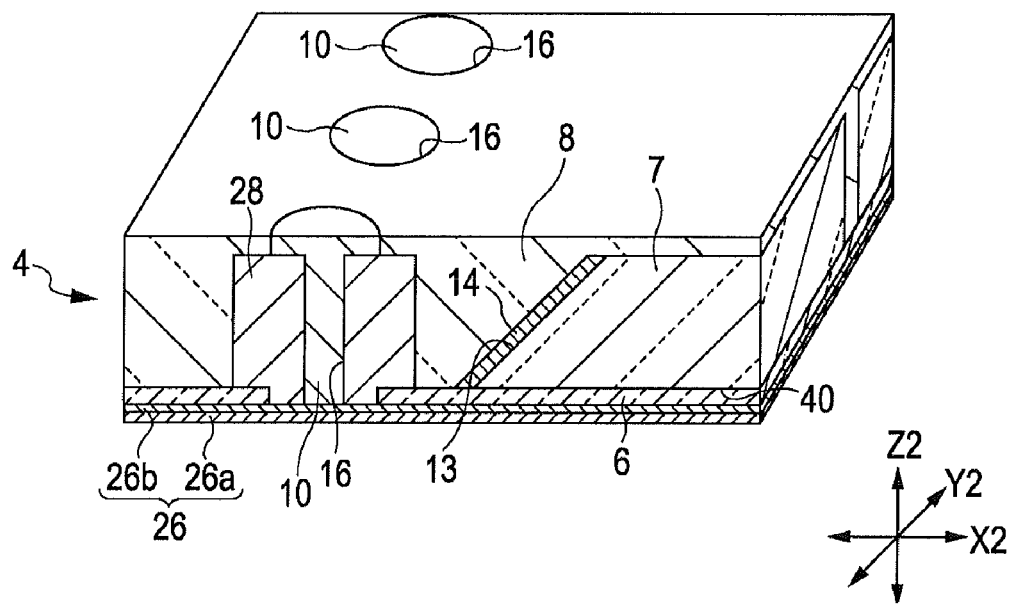
FIG. 3F is another perspective sectional view illustrating the method for manufacturing the optical circuit module shown in FIG. 1.

In step S8, the through electrodes 10 are formed in the through holes 16, as shown in FIG. 3F. Thus, a laminated body corresponding to the optical waveguide member 4 is formed on the transfer member 26.

The through electrodes 10 are formed by filling the through holes 16 with a conductive material, such as copper, by electroplating. In this process, the surface of the metal film 26b included in the transfer member 26 is exposed at the surface of the optical waveguide member 4. Therefore, the through electrodes 10 can be easily formed.

Figure 3G:
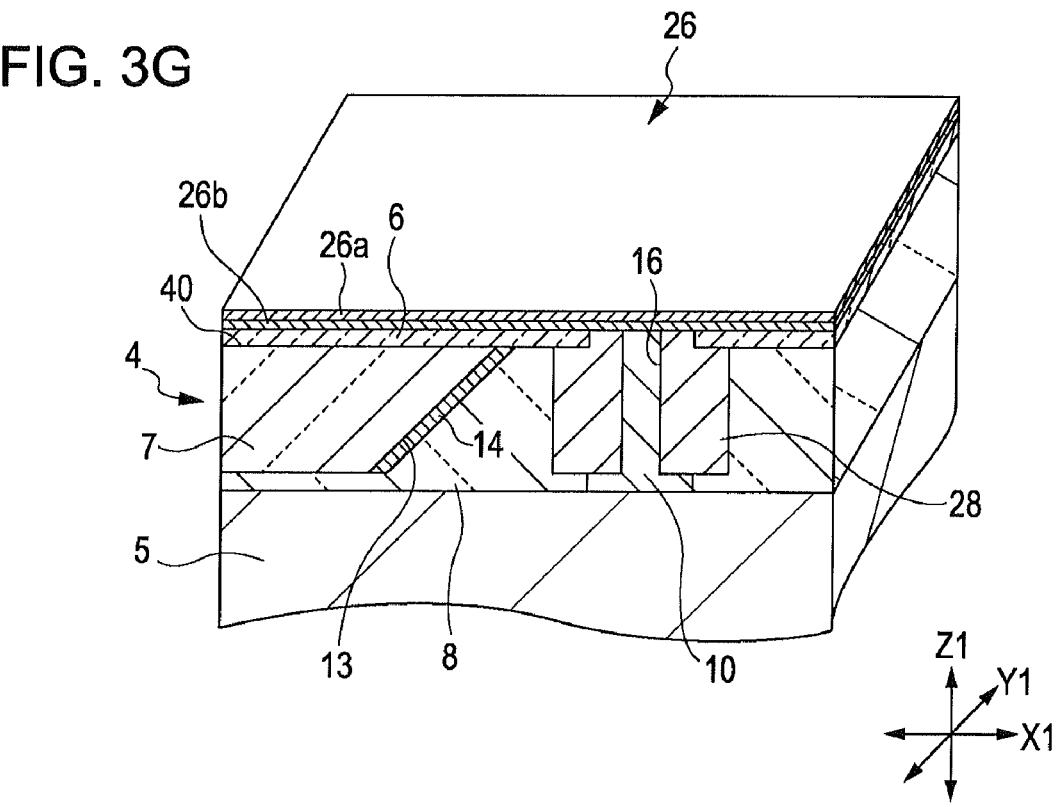
FIG. 3G is another perspective sectional view illustrating the method for manufacturing the optical circuit module shown in FIG. 1.

In step S9, the optical waveguide member 4 formed on the transfer member 26 is transferred onto the support board 5, as shown in FIG. 3G. More specifically, the optical waveguide member 4 is fixed to the support board 5 with an adhesive such that the second clad layer 8 comes into contact with the support board 5. At this time, the through electrodes 10 in the optical waveguide member 4 are electrically connected to the circuit conductors provided on the support board 5.

Figure 3H:
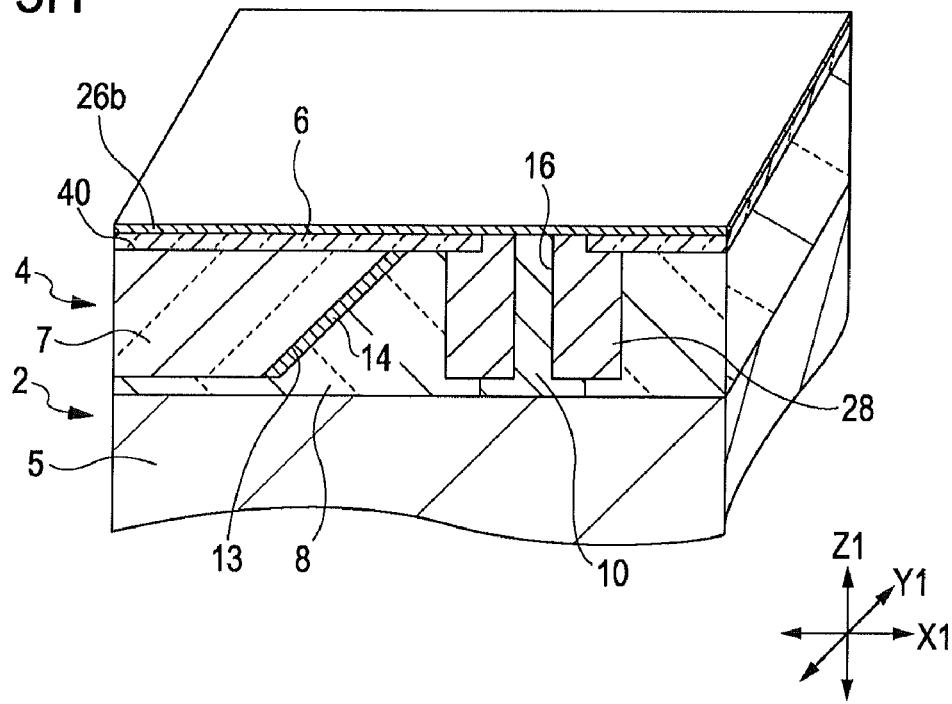
FIG. 3H is another perspective sectional view illustrating the method for manufacturing the optical circuit module shown in FIG. 1.

In step S10, the transfer sheet 26a in the transfer member 26 is peeled off the metal film 26b, as shown in FIG. 3H.

Figure 3I:
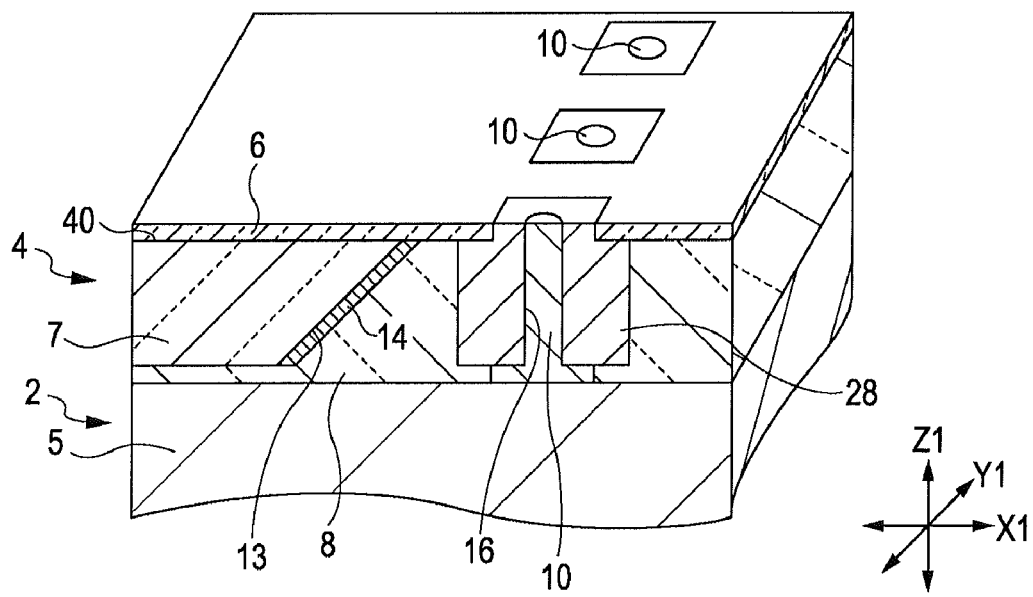
FIG. 3I is another perspective sectional view illustrating the method for manufacturing the optical circuit module shown in FIG. 1.

In step S11, the metal film 26b of the transfer member 26 is removed from the first clad layer 6 by etching, as shown in FIG. 3I. After the metal film 26b is etched away, the first clad layer 6 and the through electrodes 10 are exposed.

Figure 3J:
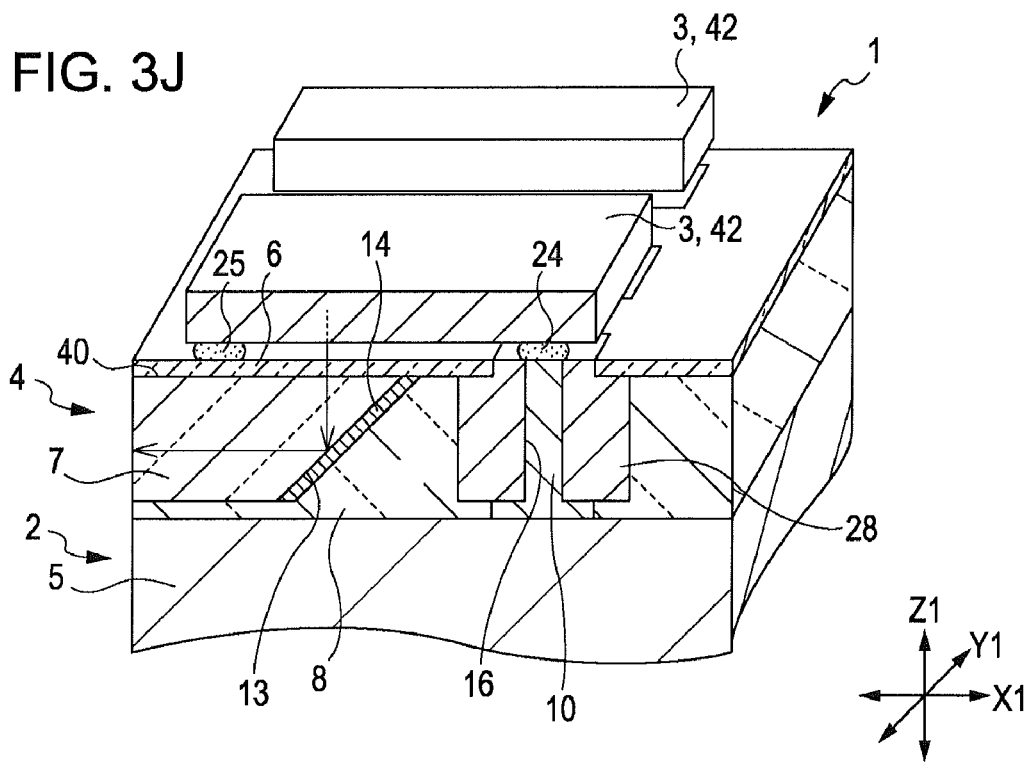
FIG. 3J is another perspective sectional view illustrating the method for manufacturing the optical circuit module shown in FIG. 1.

In step S12, the light emitting elements 3 are mounted on the respective through electrodes 10, as shown in FIG. 3J. More specifically, the light emitting elements 3 are connected to the respective through electrodes 10 with the bumps 24 and are connected to the first clad layer 6 with the dummy bumps 25. In the case of forming the bumps 24 and the dummy bumps 25 with solder, the light emitting elements 3 can be mounted with high positioning accuracy due to the self alignment effect between the through electrodes 10 and the bumps 24. When the light emitting elements 3 are mounted, the optical circuit module 1 is completed and the process of manufacturing the optical circuit module 1 is finished.

If recesses are formed in the surfaces of the through electrodes 10 to which the bumps 24 are connected, the bumps 24 and the dummy bumps 25 can easily self-align to the recesses. Therefore, the light emitting elements 3 can be easily positioned.

Advantages of the above-described manufacturing method will now be described. According to the manufacturing method of the present embodiment, the inclined surfaces 13 can be easily formed because the optical waveguide member is formed by the transferring process. In addition, according to the present embodiment, the inclined surfaces 13 are continuously covered by the second clad layer 8 that covers the core layers 7. Thus, the inclined surfaces 13 can be adequately covered by the second clad layer 8. The inclined surfaces 13 may also be covered by a third clad layer that is different from the first and second clad layers.

According to the manufacturing method of the present embodiment, not only the inclined surfaces 13 but also the surfaces of the core layers 7 are exposed when the reflective film 14 is formed. Therefore, the reflective film 14 can be easily formed on the inclined surfaces 13, and the productivity of the process of manufacturing the optical waveguide member 4, the optical circuit board 2, and the optical circuit module 1 can be maintained at a high level.

According to the manufacturing method of the present embodiment, the optical waveguide member 4 is fixed to the support board 5 after the optical waveguide member 4 is formed on the transfer member 26. Therefore, the surface of the optical waveguide member 4 on which the light emitting elements 3 are mounted can be made extremely flat. As a result, the light emitting elements 3 can be aligned at high positioning accuracy. This also contributes to increasing the productivity. An allowable error range of light emitted from the light emitting elements 3 is preferably within ±1 μm with respect to the inclined surfaces 13 and the reflective film 14, which function as mirrors for reflecting the light. The light emitting elements 3 are positioned with respect to the inclined surfaces 13 within the above-mentioned allowable error range.

According to the manufacturing method of the present embodiment, the through electrodes 10 are formed at positions spaced from the inclined surfaces 13. Therefore, the through electrodes 10 can be easily connected to the circuit conductors on the support board 5 and to the light emitting elements 3. In addition, since the through electrodes 10 are formed at positions spaced from the inclined surfaces 13, the through electrodes 10 can be used as alignment markers for the light emitting elements 3 or the light receiving elements 42 in the process of mounting the light emitting elements 3.

According to the manufacturing method of the present embodiment, the through electrodes 10 and the metal film 26b in the transfer member 26 may be formed of the same conductive material. In such a case, the bonding strength between the through electrodes 10 and the metal film 26b can be increased. Thus, the optical waveguide member 4 can be prevented from being unintentionally detached from the transfer member 26 before the optical waveguide member 4 is transferred onto the support board 5.

Figure 1B:
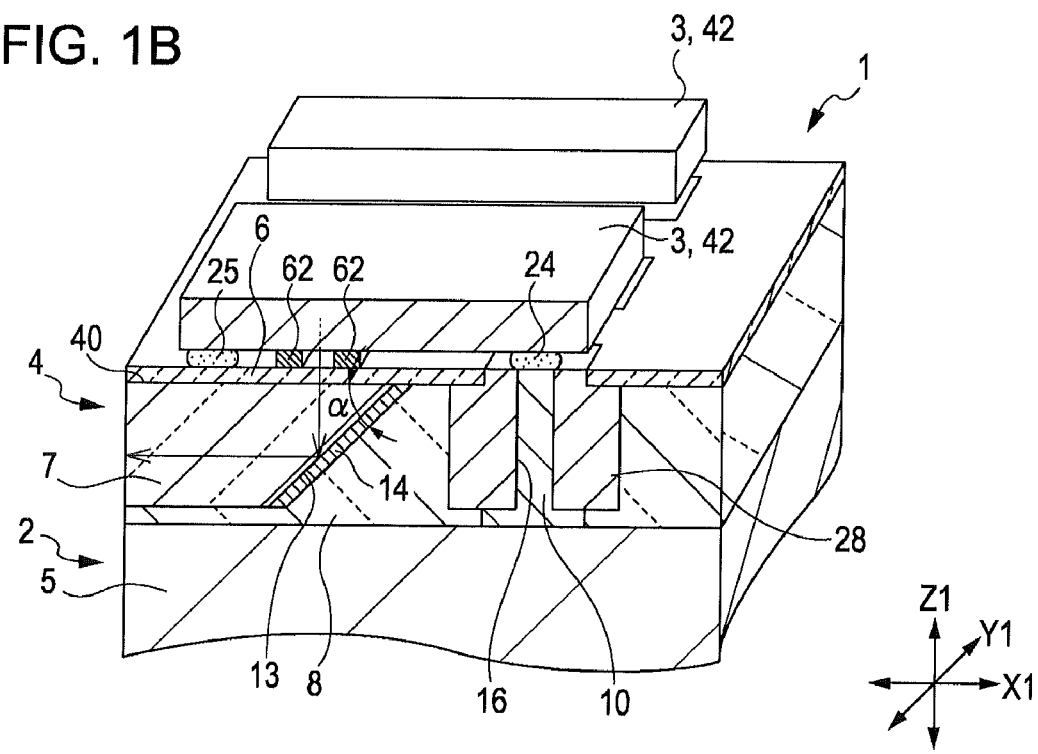
FIG. 1B is a perspective sectional view illustrating a modification of the optical circuit module according to the first embodiment.
Figure 1C:
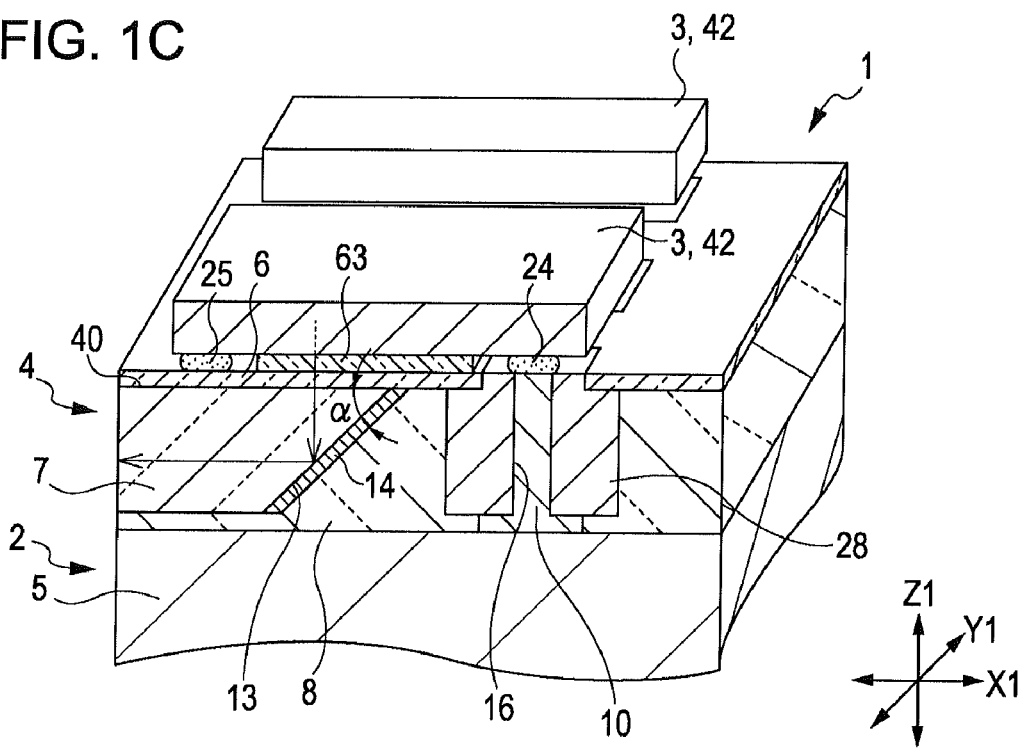
FIG. 1C is a perspective sectional view illustrating another modification of the optical circuit module according to the first embodiment.

In one embodiment, air gaps are provided between the light emitting elements 3 and the optical waveguide member 4D. As shown in FIG. 1B, light-blocking members 62 may be provided in the air gaps such that the light-blocking members 62 surround light beams emitted from the respective light emitting elements 3. In such a case, light emitted from each light emitting element 3 can be adequately blocked from the outside. As a result, the light can be prevented from being emitted toward other light emitting elements or light receiving elements.

The light-blocking members 62 comprise a light blocking resin. The light blocking resin may be, for example, epoxy resin, cyanate resin, polyphenylene ether resin, bismaleimide-triazine resin, or polyimide resin in which carbon powder, graphite powder, or the like is mixed. Alternatively, the light blocking resin may be a resin material blackened by adding stain or colorant, epoxy resin in which silica filler and carbon powder are mixed, etc.

With regard to the light blocking resin, the ratio of the amount of light transmitted through the resin to the amount of light incident thereon ((amount of transmitted light)/(amount of incident light)) per 1 cm of the resin at the wavelength (for example, 850 nm) of light that is used is preferably −30 dB or less, and more preferably, −40 dB or less.

The amount of transmitted light is measured as follows. First, first and second optical fibers are prepared, and second a laser beam or light from an LED is transmitted from the first optical fiber to the second optical fiber while the resin is interposed between the first and second optical fibers. Then, the amount of light emitted from the second optical fiber is measured by a power meter as the amount of transmitted light. The amount of incident light is measured as follows. That is, first, light is transmitted from the first optical fiber to the second optical fiber while the first and second optical fibers are directly connected to each other without interposing the resin therebetween. Second, the amount of light emitted from the second optical fiber is measured by a power meter as the amount of incident light. The obtained amounts of light are used to determine the ratio of the amount of transmitted light to the amount of incident light.

In one embodiment, as shown in FIG. 10, light transmitting members 63 including light transmitting resin may be disposed between the light emitting elements 3 and the optical waveguide member 4. The light transmitting members 63 are provided such that each light transmitting member 63 is in contact with both the corresponding light emitting element 3 and the optical waveguide member 4. Thus, the light emitting elements 3 can be strongly mechanically fixed to the optical waveguide member 4 by the light transmitting members 63.

With regard to the light transmitting resin forming the light transmitting members 63, the ratio of the reduction (loss) in the amount of light versus the amount of incident light per 1 cm of the light transmitting resin at the wavelength (for example, 850 nm) used is 6 dB or less, preferably 3 dB or less, and more preferably, 0.5 dB or less. The ratio is defined as (reduction in the amount of light)/(amount of incident light).

The amount of transmitted light is measured as follows. That is, first, first and second optical fibers are prepared, and second a laser beam or light from an LED is transmitted from the first optical fiber to the second optical fiber while the resin interposed between the first and second optical fibers. Then, the amount of light emitted from the second optical fiber is measured by a power meter as the amount of transmitted light. The reduction in the amount of light is measured by determining the amount of incident light and subtracting the amount of transmitted light from the amount of incident light. The amount of incident light is measured as follows. That is, first, light is transmitted from the first optical fiber to the second optical fiber while the first and second optical fibers are directly connected to each other without interposing the resin therebetween. Then the amount of light emitted from the second optical fiber is measured by a power meter as the amount of incident light. The obtained amounts of light are used to determine the ratio of the reduction (loss) in the amount of light versus the amount of incident light.

The light transmitting members 63 are formed by injecting a predetermined amount of epoxy resin, acrylic resin, or silicone resin into the gaps between the light emitting elements 3 and the optical waveguide member 4 with a dispenser or the like and curing the resin.

Figure 1D:
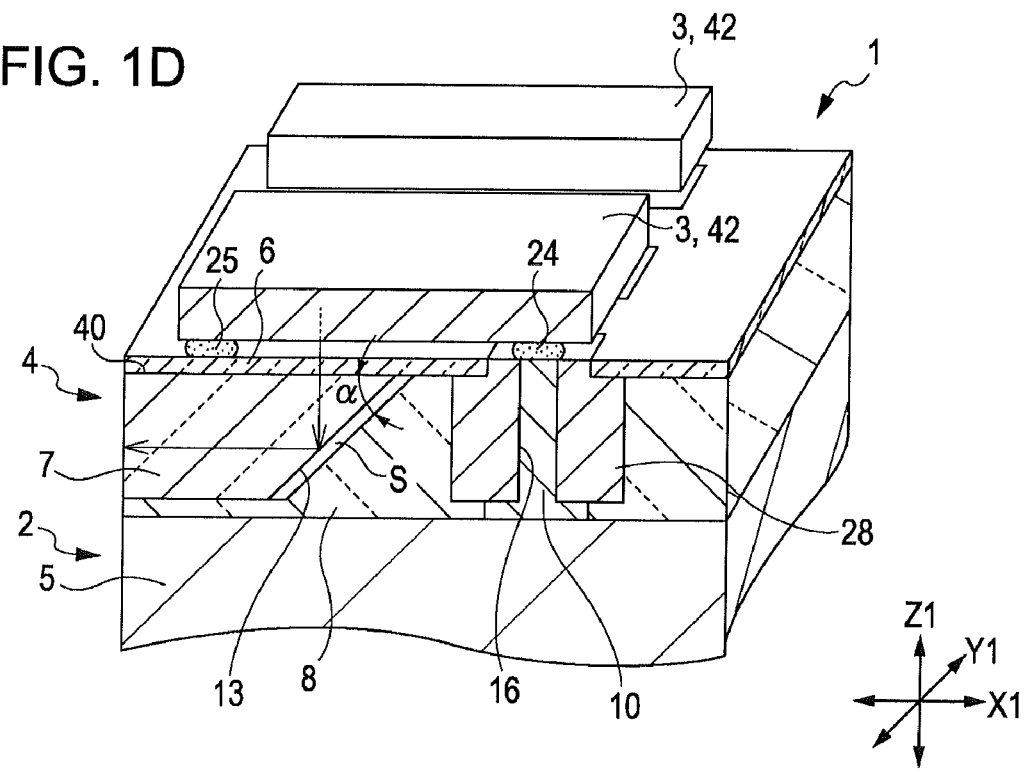
FIG. 1D is a perspective sectional view illustrating another modification of the optical circuit module according to the first embodiment.

According to the present embodiment, the reflective film 14 is formed on each of the inclined surfaces 13. However, the reflective film 14 may also be omitted, as shown in FIG. 1D. For example, a space S may be formed between the second clad layer 8 and each of the inclined surfaces 13 instead of the reflective film 14. If the refractive index of air contained in the space S is higher than the refractive index of the core layers 7, light is reflected by the inclined surfaces 13. Therefore, an effect similar to that obtained when the reflective film 14 is provided can be obtained.

In the present embodiment, the through electrodes 10 may be formed after step S11. In such a case, the circuit conductors on the circuit board can be strongly connected to the through electrodes 10. However, electroplating for forming the through electrodes 10 cannot be efficiently performed. Therefore, in this case, first a conductive material layer including copper, nickel, chromium, titanium, tungsten, or molybdenum is formed by electroless plating, vapor deposition, sputtering, etc. on the surface of the first clad layer 6 that is exposed by removing the metal film 26b in step S11. Then, the through electrodes 10 are formed in the through holes 16 on the inner surface of which the conductive material layer is formed. In this case, it is difficult to form the conductive material layer on the first clad layer 6 by electroless plating. Therefore, the through electrodes 10 are preferably formed by the following process.

Figure 3K:
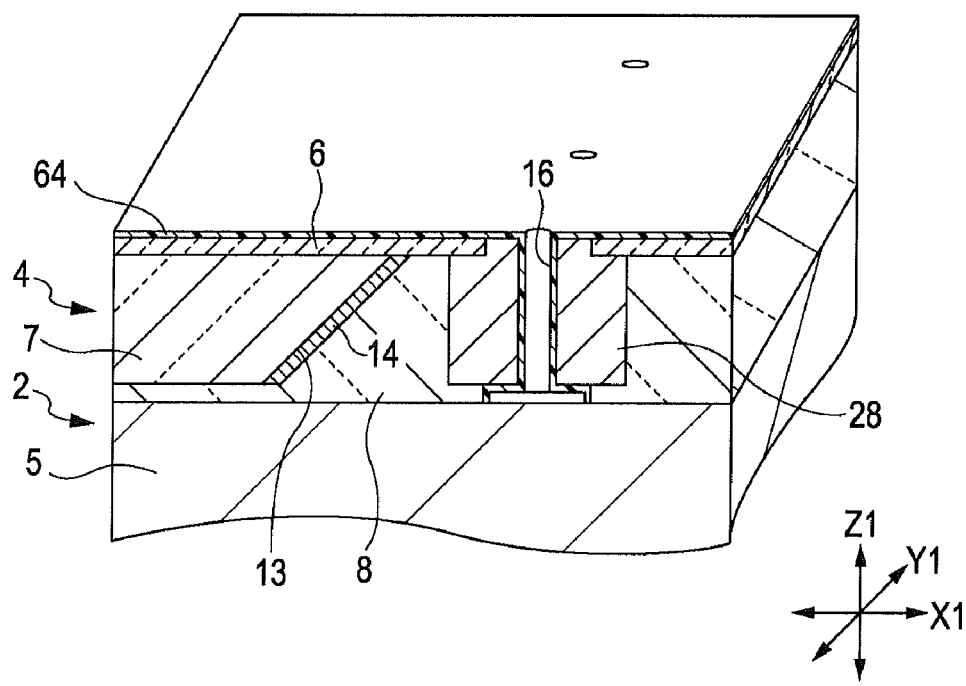
FIG. 3K is a perspective sectional view illustrating a method for forming through electrodes.
Figure 3L:
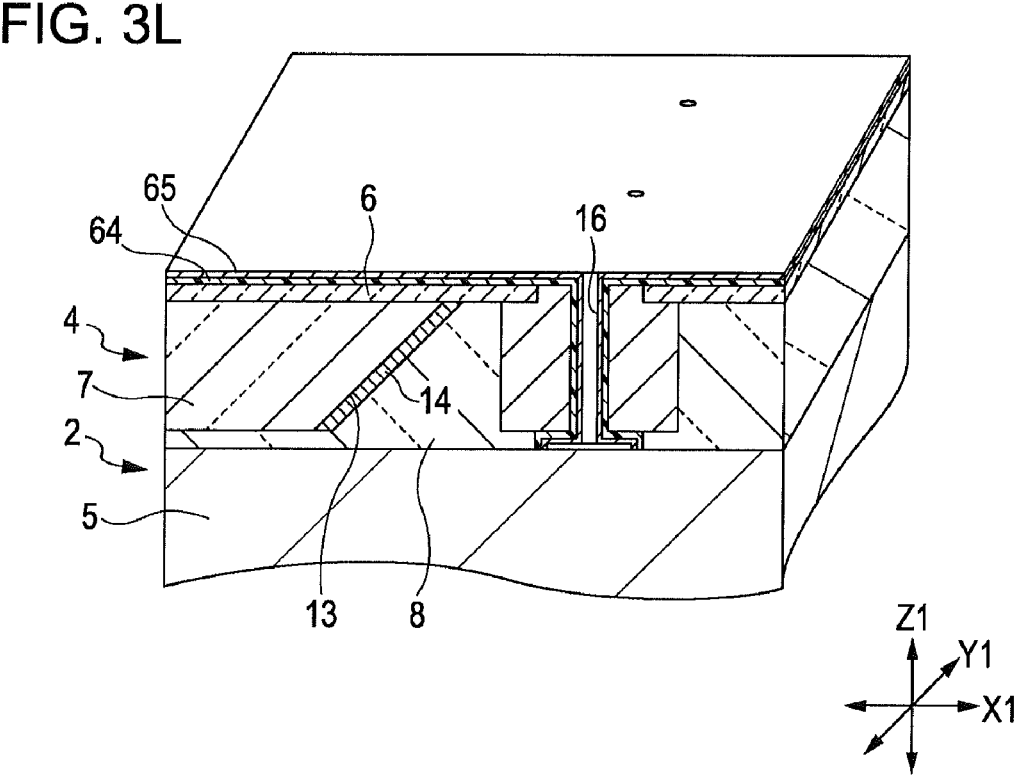
FIG. 3L is another perspective sectional view illustrating the method for forming through electrodes.
Figure 3M:
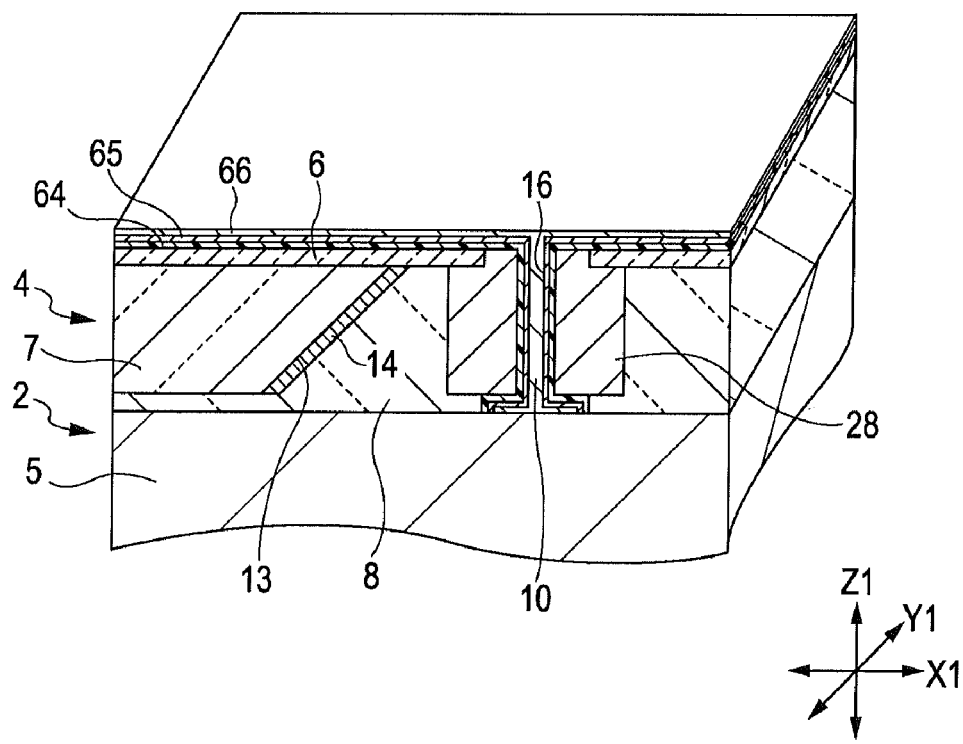
FIG. 3M is another perspective sectional view illustrating the method for forming through electrodes.
Figure 3N:
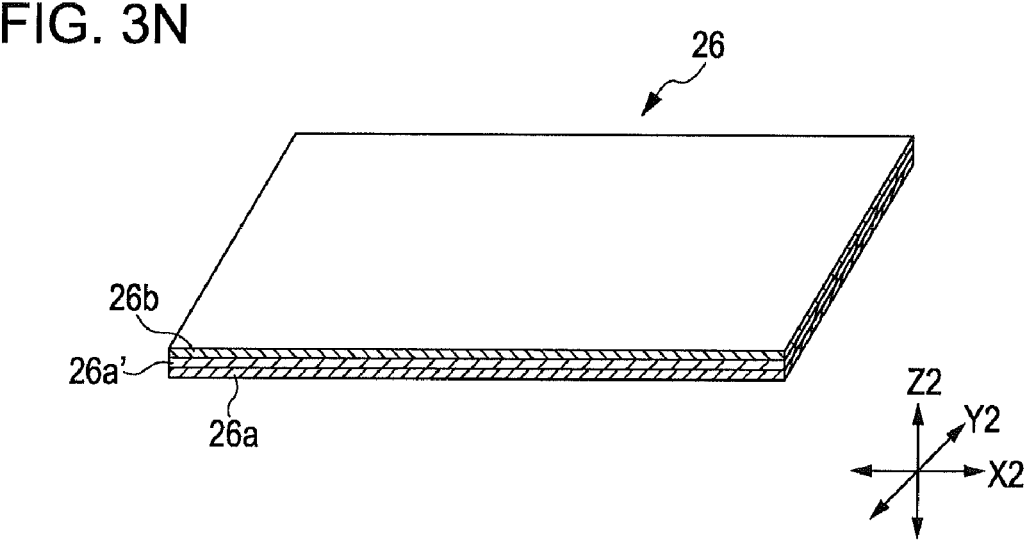
FIG. 3N is a perspective sectional view of a transfer member.

First, as shown in FIG. 3K, a resin material layer 64 including epoxy resin or the like is formed on the first clad layer 6 and the inner surfaces of the through holes 16. Second, as shown in FIG. 3L, a first conductive material layer 65 is formed on the surface of the resin material layer 64 by electroless plating. Then, as shown in FIG. 3M, the through electrodes 10 are formed on the first conductive material layer 65 in the through holes 16 by electroplating. At this time, a second conductive material layer 66 made of the same material as that of the through electrodes 10 is formed on the first conductive material layer 65. The resin material layer 64, the first conductive material layer 65, and the second conductive material layer 66 may be removed or be formed into a certain pattern by etching or the like as necessary.

Second Embodiment

Figure 4A:
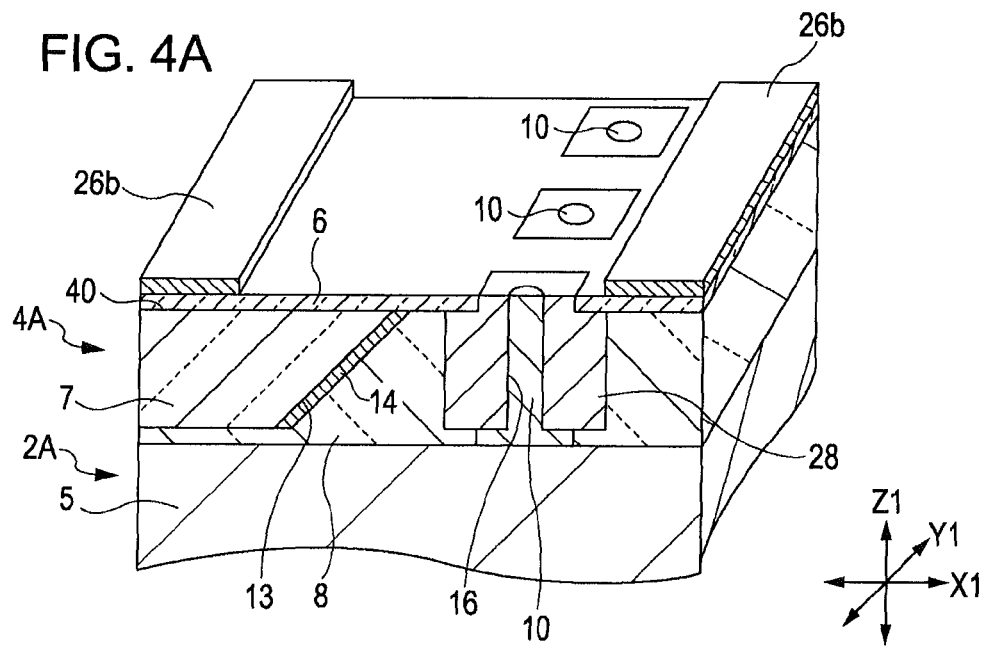
FIG. 4A is a perspective sectional view illustrating an optical circuit board according to a second embodiment of the present invention.
Figure 4B:
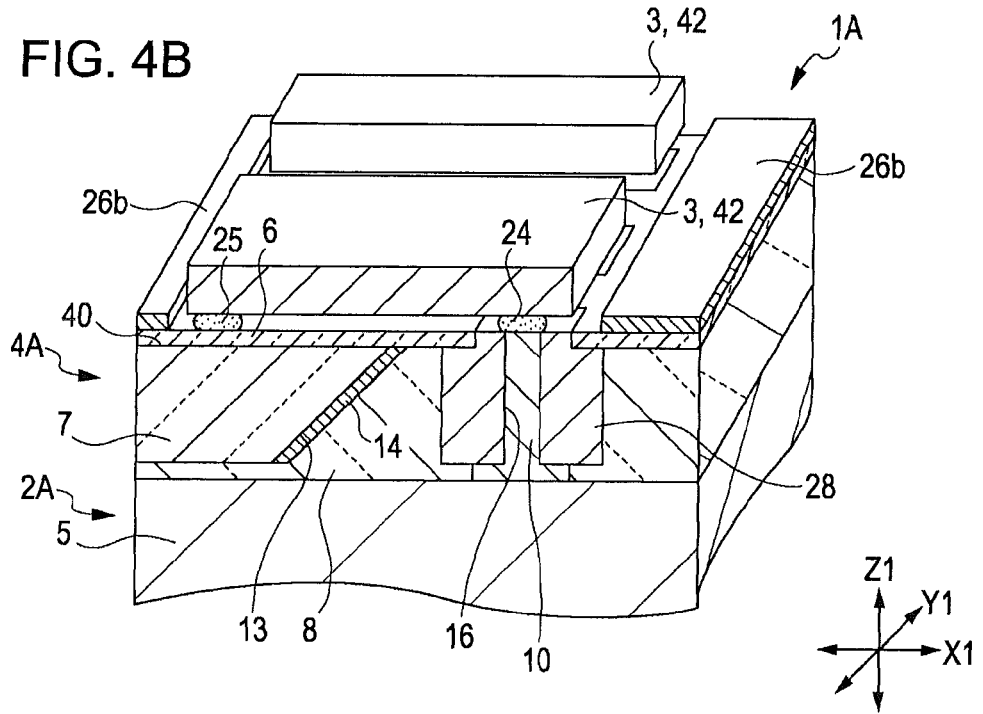
FIG. 4B is a perspective sectional view illustrating an optical circuit module according to the second embodiment.
Figure 4C:
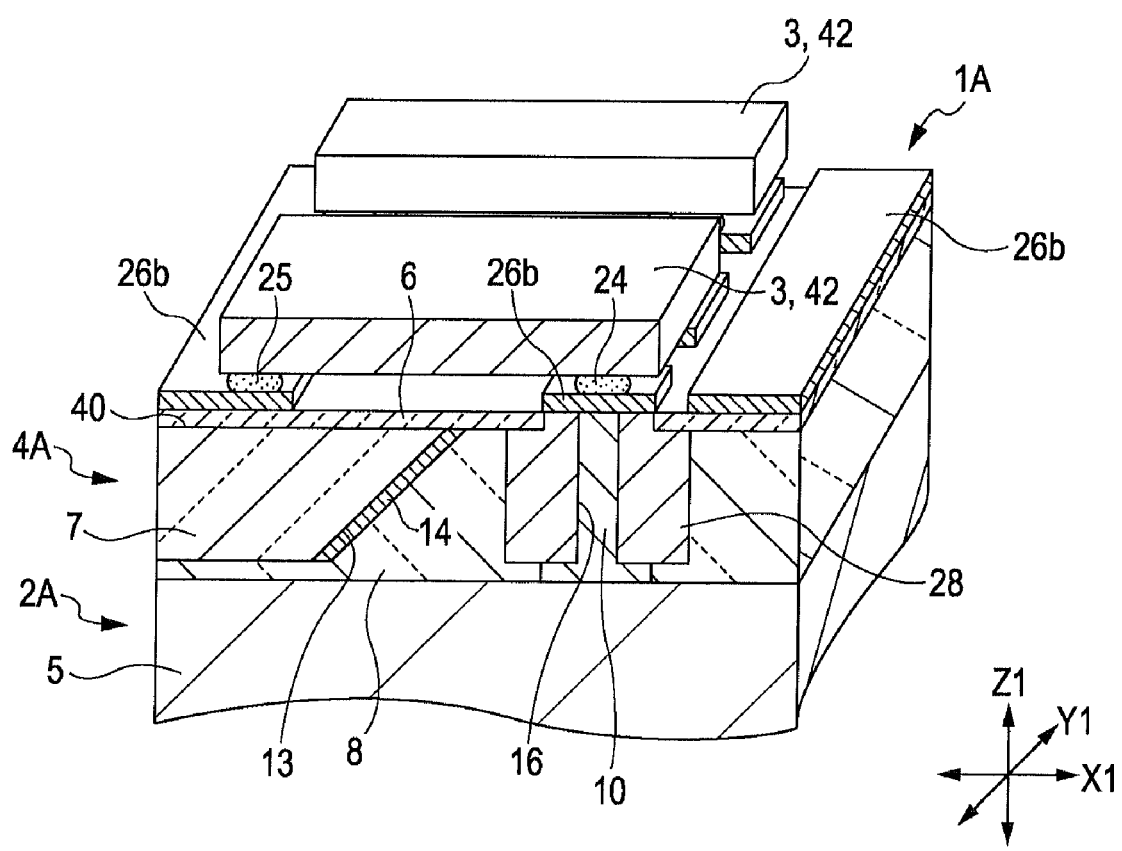
FIG. 4C is a perspective sectional view illustrating a modification of the optical circuit module according to the second embodiment.

FIG. 4A is a perspective sectional view illustrating an optical circuit board 2A according to a second embodiment. FIG. 4B is a perspective sectional view illustrating an optical circuit module 1A according to the second embodiment. FIG. 4C is a perspective sectional view illustrating a modification of the optical circuit module 1A according to the second embodiment. Only the structures different from those of the first embodiment will be described below, and explanations of structures common to the first embodiment will be omitted. Basically, the second embodiment provides advantages similar to those of the first embodiment.

In the optical circuit module 1A, the metal film 26b in the transfer member 26 is not entirely removed. More specifically, the metal film 26b is removed in areas where the light emitting elements 3 are to be mounted and in areas where the through electrodes 10 are to be formed, but is not removed in other areas. Thus, an electrical circuit can be formed by etching the remaining metal film 26b. As a result, it is not necessary to additionally form the electrical circuit on the optical waveguide member 4A by transferring, plating, etc., and the number of manufacturing steps can be reduced.

In the present embodiment, the light emitting elements 3 may be connected to the metal film 26b via the dummy bumps 25, as shown in FIG. 4C. In addition, the dummy bumps 25 may also be configured to function as normal bumps so that the light emitting elements 3 are electrically connected to the metal film 26b.

The optical circuit module 1A of the present embodiment, of course, provides advantages similar to those of the first embodiment.

Third Embodiment

Figure 5:
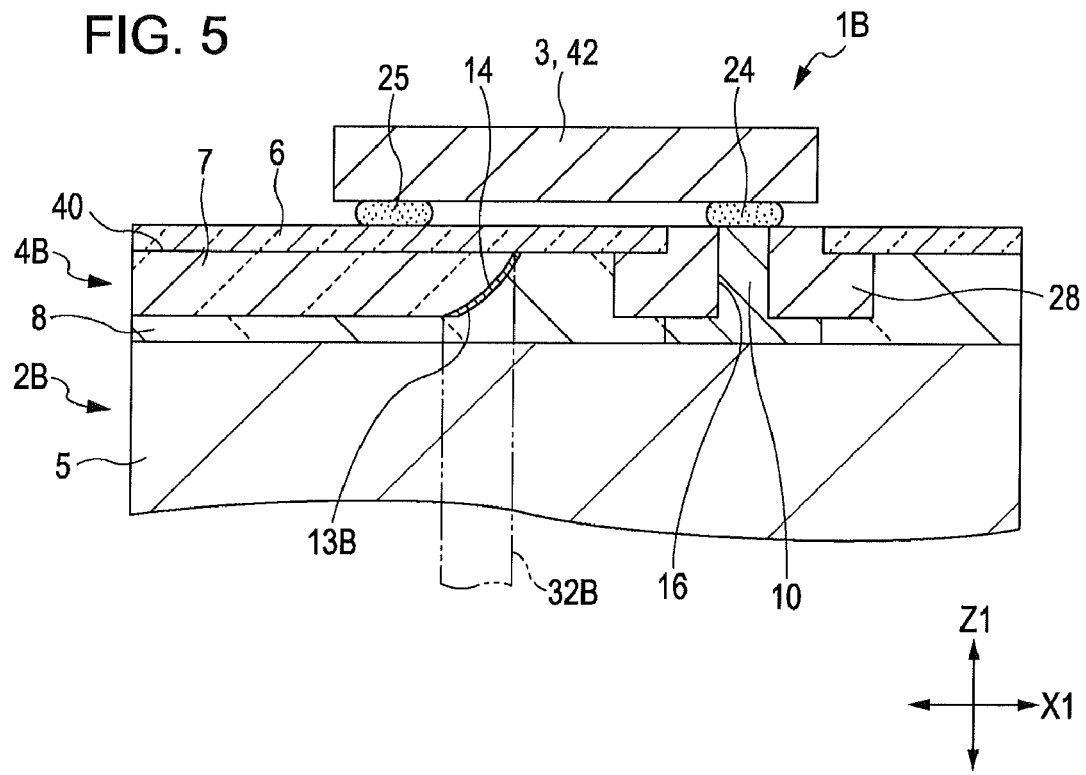
FIG. 5 is a sectional view illustrating an optical circuit module according to a third embodiment of the present invention.

FIG. 5 is a diagram illustrating an optical circuit module 1B according to a third embodiment. Only the structures different from those of the first embodiment will be described below, and explanations of structures common to the first embodiment will be omitted. Basically, the third embodiment provides advantages similar to those of the first embodiment.

In the optical circuit module 1B, different from the first embodiment, inclined surfaces 13B are curved such that the inclined surfaces 13B are convex toward the second clad layer 8. Therefore, even when the light emitting elements 3 are tilted with respect to the surface of the optical waveguide member 4B, light emitted from the light emitting elements 3 and incident on the inclined surfaces 13B can be reliably reflected toward the respective core layers 7. Therefore, limitation of the arrangement positions of the light emitting elements 3 or the light receiving elements 42 can be reduced and allowable errors of the arrangement positions can be increased. Thus, the productivity of the optical circuit module can be increased.

The inclined surfaces 13B having the above-mentioned shape can be formed in step S4 explained in the first embodiment by pressing a tool 32B against the core material layers 27. Here, the tool 32B used in this step has an end with a shape corresponding to the inclined surfaces 13B, as shown by the imaginary lines in FIG. 5.

The curved surfaces can be formed by using the tool 32B having a curved surface. In the state in which the amount of resin material of the core material layers 27 that has undergone the hardening reaction is in the range of 50% to 90%, the curved inclined surfaces 13B can be formed by using elastic deformation of the core material layers 27.

Although the inclined surfaces 13B are curved in the present embodiment, the shape of the inclined surfaces 13B is not limited to this. For example, the inclined surfaces may also be stepped as long as light from the light emitting elements 3 can be adequately reflected toward the respective core layers 7.

Fourth Embodiment

Figure 6:
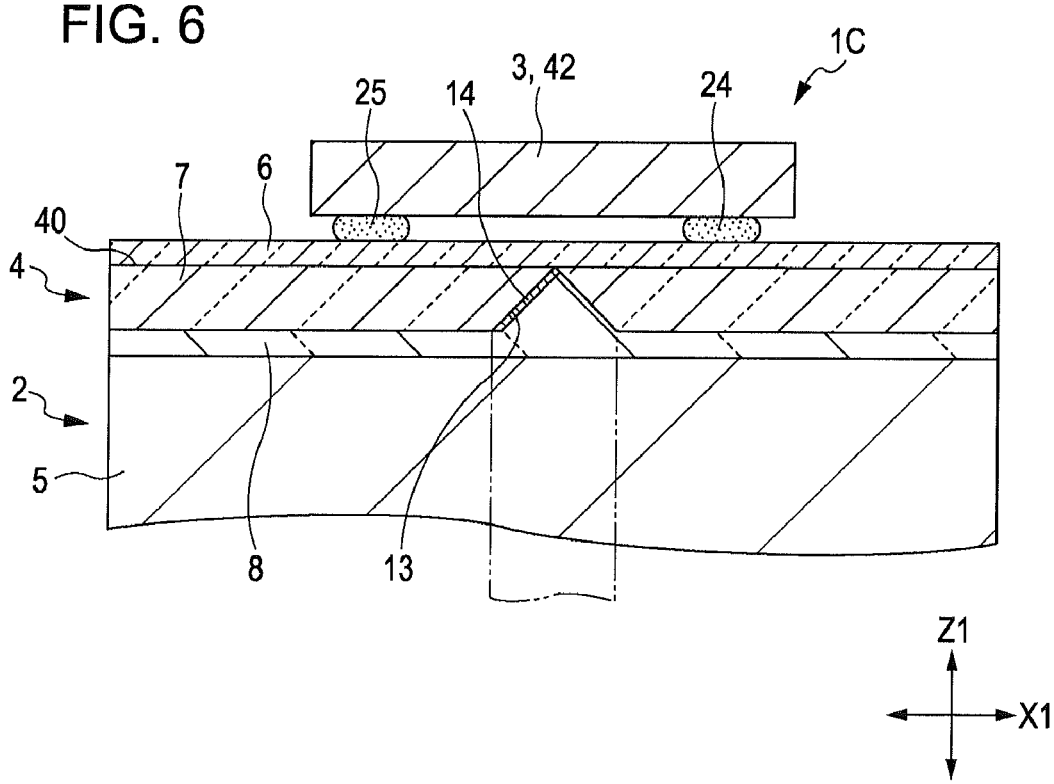
FIG. 6 is a sectional view illustrating an optical circuit module according to a fourth embodiment of the present invention.

FIG. 6 is a diagram illustrating an optical circuit module 1C according to a fourth embodiment. Only the structures different from those of the first embodiment will be described below, and explanations of structures common to the first embodiment will be omitted. Basically, the fourth embodiment provides advantages similar to those of the first embodiment.

The optical circuit module 1C differs from that of the first embodiment in that each inclined surface 13 is formed at an intermediate position of the corresponding core layer 7 instead of at an end thereof. Also in this case, advantages similar to those of the first embodiment can be obtained. Thus, there is a high degree of versatility in positioning the inclined surfaces 13.

Fifth Embodiment

Figure 7:
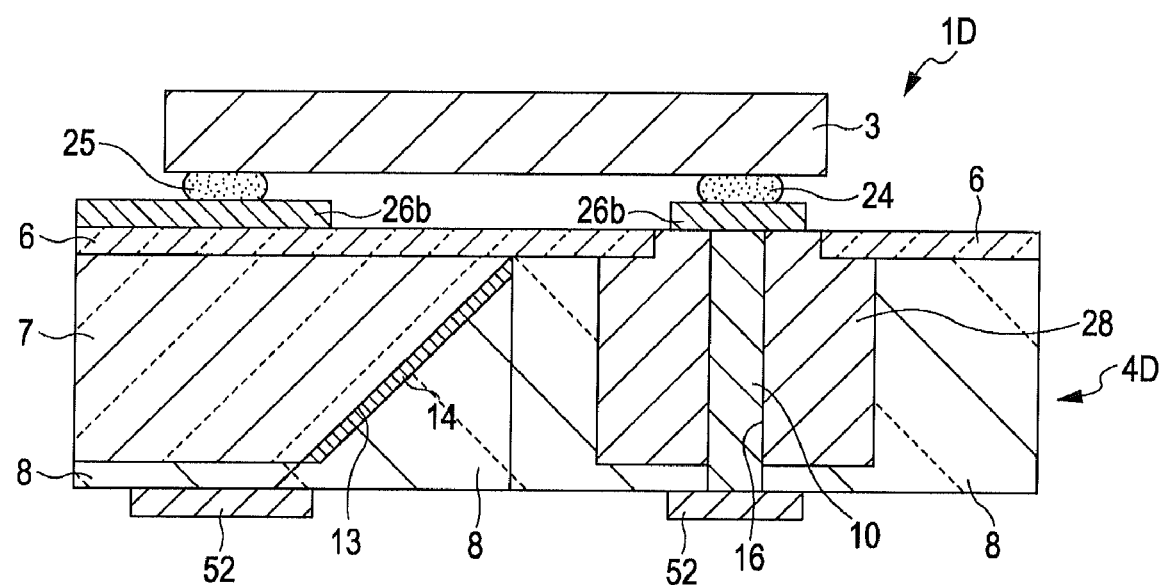
FIG. 7 is a sectional view illustrating an optical circuit module according to a fifth embodiment of the present invention.
Figure 7:
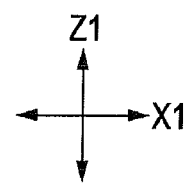

FIG. 7 is a sectional view of an optical waveguide member 4D according to a fifth embodiment. Only the structures and manufacturing methods different from those of the optical waveguide member 4A according to the second embodiment will be described below, and explanations of structures common to the second embodiment will be omitted.

Similar to the second embodiment, in the present embodiment, the optical waveguide member 4D includes the metal film 26b that is in contact with the first clad layer 6. The present embodiment differs from the second embodiment and other embodiments in that a third metal film 52 is provided on the second clad layer 8. Thus, metal films are provided on both sides of the optical waveguide member 4D.

The second metal film 26b may be formed by transferring, similar to the second embodiment. Alternatively, the second metal film 26b may be formed by electroless plating or the like. In such a case, to increase the adhesion strength between the second metal film 26b and the first clad layer 6, epoxy resin is preferably applied to the first clad layer 6 before the second metal film 26b is formed. Then, electroless plating is performed to form the second metal film 26b.

Similar to the second metal film 26b, the third metal film 52 may be formed by transferring or by electroless plating. In the case of forming the third metal film 52 by electroless plating, epoxy resin is preferably applied to the second clad layer 8 before the third metal film 52 is formed.

The optical waveguide member 4D according to the present embodiment may either be mounted or not mounted on the support board 5. Even when the optical waveguide member 4D is not mounted on the support board 5, the optical waveguide member 4D is capable of functioning as a circuit board if the second metal film 26b and the third metal film 52 are formed in a predetermined pattern. In the case of mounting the optical waveguide member 4D on the support board 5, optical semiconductor elements (light emitting elements or light receiving elements) may be mounted on the optical waveguide member 4D before the optical waveguide member 4D is mounted on the support board 5.

Sixth Embodiment

Figure 8:
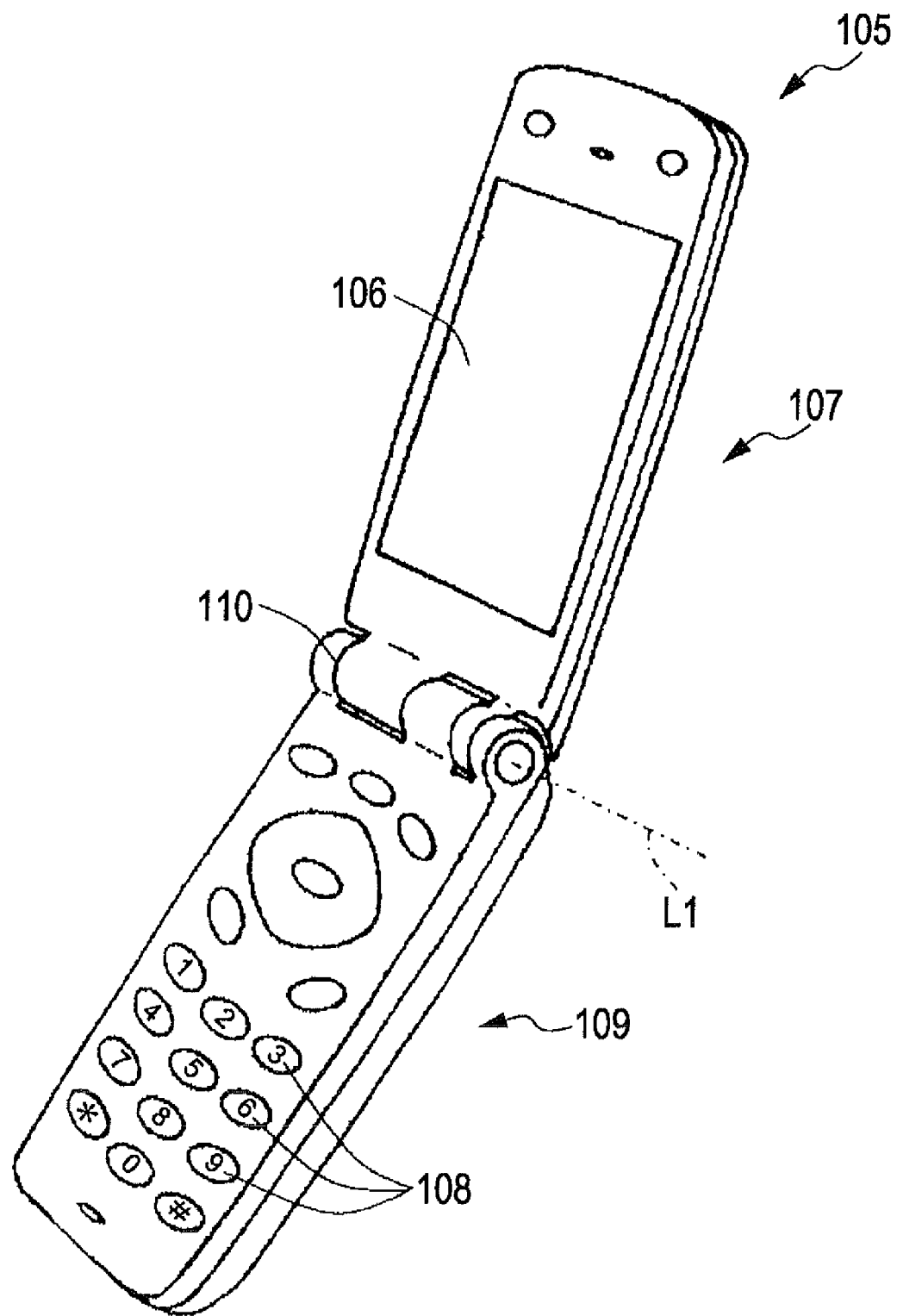
FIG. 8 is a sectional view illustrating a mobile phone apparatus according to a sixth embodiment of the present invention.
Figure 9A:
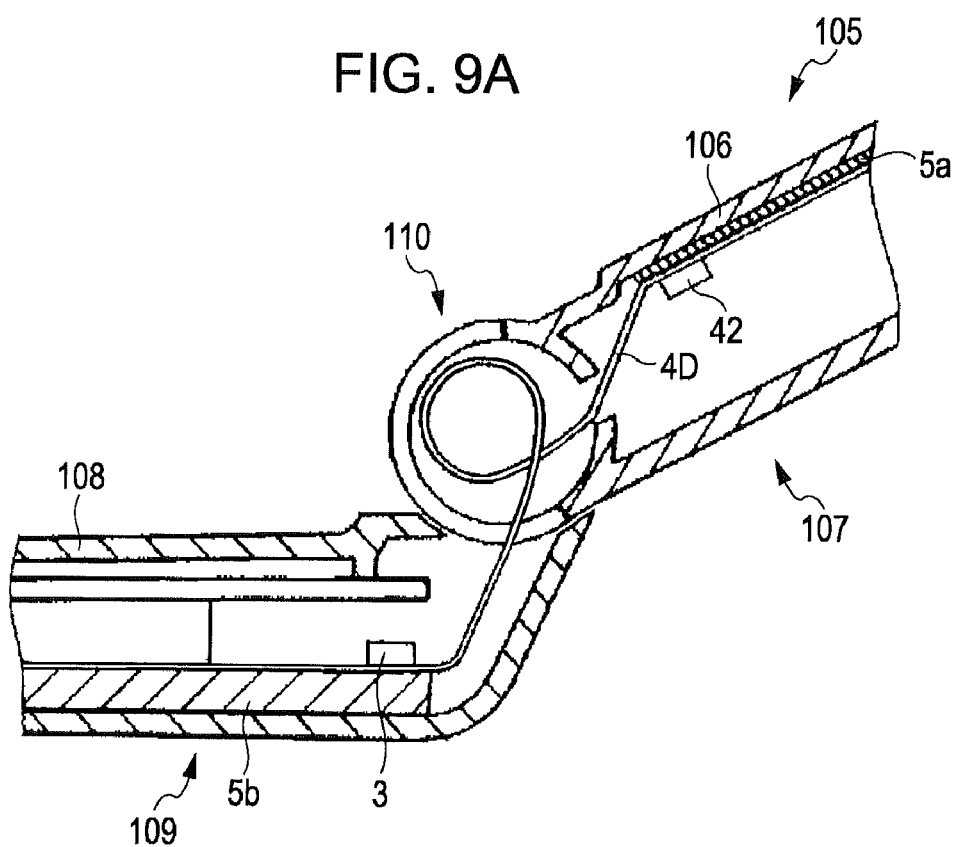
FIG. 9A is an enlarged sectional view illustrating the main part of the mobile phone apparatus shown in FIG. 8.
Figure 9B:
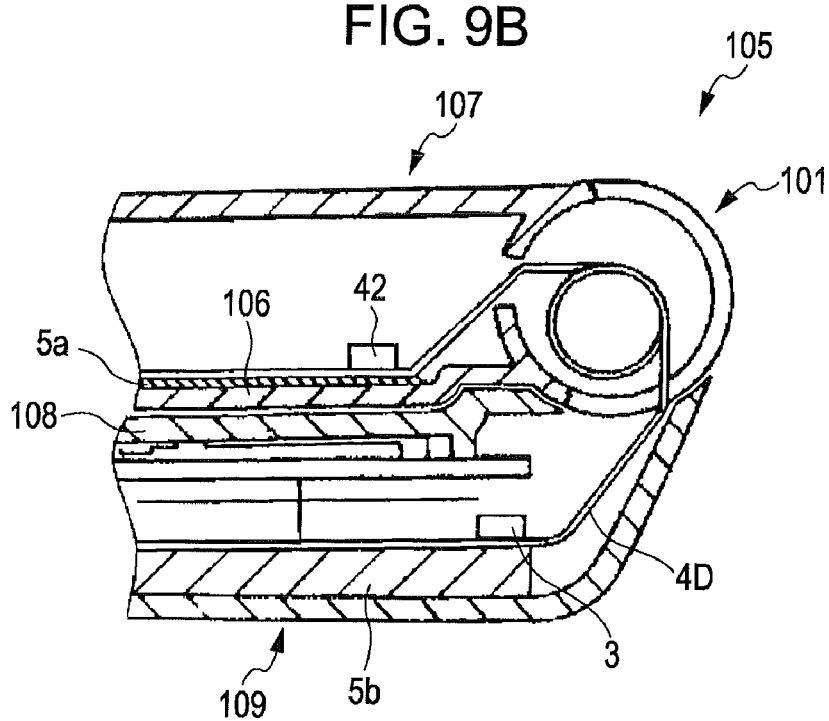
FIG. 9B is another enlarged sectional view illustrating the main part of the mobile phone apparatus shown in FIG. 8.

FIG. 8 is a perspective view illustrating a mobile phone apparatus 105 (display apparatus) according to a sixth embodiment. FIGS. 9A and 9B are enlarged sectional views illustrating the main part of the mobile phone apparatus 105. In FIGS. 9A and 9B, the core layers 7, the through electrodes 10, the inclined surfaces 13, the reflective film 14, etc., are not shown.

The mobile phone apparatus 105 according to the present embodiment includes a first housing 107 having a display unit 106, a second housing 109 having an operating unit 108, and a connecting unit 110 that connects the first housing 107 and second housing 109 to each other. The second housing 109 is movable relative to the first housing 107, and the first and second housings 107 and 109 are connected to each other by the connecting unit 110.

The mobile phone apparatus 105 can be set to, for example, an unfolded state and a folded state by adjusting an angle between the first housing 107 and the second housing 109. In the unfolded state, the display unit 106 is separated from the operating unit 108, as shown in FIG. 9A. In the folded state, the display unit 106 faces the operating unit 108, as shown in FIG. 9B.

The optical waveguide member 4D according to the fifth embodiment is disposed so as to extend through the first housing 107, the second housing 109, and the connecting unit 110. The display unit 106 in the first housing 107 and the operating unit 108 in the second housing 109 are optically connected to each other by the optical waveguide member 4D.

The optical waveguide member 4D has the light emitting elements 3 at one end thereof and the light receiving elements 42 at the other end thereof, as described below. The through electrodes 10, the inclined surfaces 13, the reflective film 14, etc., are disposed near the light emitting elements 3 and the light receiving elements 42.

The optical waveguide member 4D is flexible. Therefore, optical communication can be provided even when the optical waveguide member 4D is bent as shown in FIG. 9B. The Young's modulus of the optical waveguide member 4D is preferably equal to or less than 3 GPa. In order for the optical waveguide member 4D to have sufficient flexibility, the total thickness of the first clad layer 6, the core layers 7, and the second clad layer 8 is preferably equal to or less than 90 μm. In addition, the total thickness of the metal film 26b and the third metal film 52 is preferably equal to or less than 18 μm.

The circuit board 5b and the light emitting elements 3 are arranged in the second housing 109. The circuit board 5b supports the optical waveguide member 4D and is electrically connected to the operating unit 108. The light emitting elements 3 emit light in accordance with electrical signals supplied from the circuit board 5b, and transmit the light to the optical waveguide member 4D as optical signals. The light emitting elements 3 are electrically connected to the circuit board 5b via the through electrodes 10 formed in the optical waveguide member 4D. The light from the light emitting elements 3 is transmitted to the core layers 7 by the inclined surfaces 13 and the reflective film 14 in the optical waveguide member 4D.

The circuit board 5a and the light receiving elements 42 are arranged in the first housing 107. The circuit board 5a also supports the optical waveguide member 4D and is electrically connected to the display unit 106. The light receiving elements 42 receive the optical signals transmitted through the optical waveguide member 4D, convert the received optical signals into electrical signals, and transmit the electrical signals to the circuit board 5a. The light receiving elements 42 are electrically connected to the circuit board 5a via the through electrodes 10 formed in the optical waveguide member 4D. The light supplied to the light receiving elements 42 is transmitted from the core layers 7 and is input to the light receiving elements 42 by the inclined surfaces 13 and the reflective film 14 in the optical waveguide member 4D. The circuit board described in the first to fifth embodiments may be used as the circuit boards 5a and 5b.

Information input through the operating unit 108 is transmitted to the circuit board 5b as electrical signals by electric circuits (not shown) disposed in the second housing 109. The electrical signals are supplied to the light emitting elements 3 via the through electrodes 10 formed in the optical waveguide member 4D. The light emitting elements 3 convert the electrical signals into optical signals, and the obtained optical signals are transmitted to the core layers 7 by the inclined surfaces 13 in the optical waveguide member 4D. The optical signals transmitted to the core layers 7 are input to the light receiving elements 42 by the inclined surfaces 13 in the optical waveguide member 4D. Then, the light receiving elements 42 convert the optical signals into electrical signals, and the obtained electrical signals are transmitted to the circuit board 5a via the through electrodes 10 in the optical waveguide member 4D. Then, the electrical signals are transmitted to a driving IC included in the display unit 106 through the circuit board 5a, and images are displayed by the driving IC.

According to the present embodiment, the display unit 106 in the first housing 107 and the operating unit 108 in the second housing 109 are optically connected to each other by the optical waveguide member 4D. Therefore, even when the amount of information to be transmitted to the display unit 106 is large, the information can be transmitted at a high speed and with low power consumption. Thus, a convenient mobile phone apparatus can be obtained.

In the present embodiment, the mobile phone apparatus is explained as an exemplary display apparatus. However, the present invention may also be applied to, for example, a personal computer. The optical waveguide member 4D may also be used as a connecting member for connecting a plurality of electronic apparatuses to each other. For example, the optical waveguide member 4D may be used as a connecting member for connecting a recording-and-reproducing apparatus, such as a DVD player, a DVD recorder, and a video deck, to a television set, or a connecting member for connecting a television set to a video camera.

What is claimed is:

1. An optical circuit board, comprising:
   a circuit board; and
   an optical waveguide member disposed on the circuit board,
   wherein the optical waveguide member comprises
   a first clad layer,
   a second clad layer closer to the circuit board than the first clad layer,
   a plurality of core layers between the first clad layer and the second clad layer, each core layer comprising an inclined surface, and
   a through electrode penetrating the first and the second clad layers, the through electrode being connected to the circuit board,
   wherein an angle α between the inclined surface of each core layer and a surface of the core layer that faces the first clad layer, is equal to or less than 90 degrees, and wherein an area in a cross section of the through electrode is larger at a side of the circuit board than at a side opposite to the circuit board.

2. The optical circuit board according to claim 1, wherein the angle α is in the range of 41 degrees to 49 degrees.

3. The optical circuit board according to claim 1, wherein each inclined surface is curved such that the inclined surface has convex toward the second clad layer.

4. The optical circuit board according to claim 1, wherein each inclined surface is covered with a reflective film that reflects light.

5. The optical circuit board according to claim 4, wherein the second clad layer is formed so as to cover each inclined surface and the reflective film.

6. The optical circuit board according to claim 1, wherein the optical waveguide member has a flat surface.

7. The optical circuit board according to claim 1, wherein the optical waveguide member has a conductive layer on a surface of the first clad layer that is opposite to the circuit board.

8. The optical circuit board according to claim 7, wherein the optical waveguide member has a resin layer disposed between the conductive layer and the opposite surface of the first clad layer to the circuit board.

9. The optical circuit board according to claim 8, wherein the conductive layer is formed by electroless plating.

10. An optical circuit module, comprising:
    an optical circuit board according to claim 1; and
    optical semiconductor elements connected to a circuit pattern on the optical circuit board.

11. An optical waveguide member, comprising:
    a first clad layer;
    a core layer on the first clad layer, the core layer comprising an inclined surface;
    a second clad layer that continuously covers the core layer and the inclined surface; and
    a through electrode penetrating the first and the second clad layers;
    wherein an area in a cross section of the through electrode is larger at a side of the second clad layer than at a side of the first clad layer.

12. The optical waveguide member according to claim 11, further comprising a pair of metal films, at least one of the metal films being adhered to each of the clad layers by a transferring process.

13. A display apparatus, comprising:
    a display unit;
    an operating unit operable to control the display unit; and
    an optical waveguide member according to claim 11, the optical waveguide member optically connecting the display unit and the operating unit to each other.

* * * * *